US011689975B2

(12) United States Patent
Akl et al.

(10) Patent No.: US 11,689,975 B2
(45) Date of Patent: Jun. 27, 2023

(54) ENHANCED REESTABLISHMENT PROCEDURE IN INTEGRATED ACCESS AND BACKHAUL NODES

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/350,722

(22) Filed: Jun. 17, 2021

(65) Prior Publication Data

US 2022/0408326 A1 Dec. 22, 2022

(51) Int. Cl.
*H04W 36/00* (2009.01)
*H04W 8/24* (2009.01)
*H04W 88/14* (2009.01)

(52) U.S. Cl.
CPC ......... *H04W 36/0077* (2013.01); *H04W 8/24* (2013.01); *H04W 36/0061* (2013.01); *H04W 36/0072* (2013.01); *H04W 36/00837* (2018.08); *H04W 88/14* (2013.01)

(58) Field of Classification Search
CPC ............... H04W 36/0077; H04W 8/24; H04W 36/0061; H04W 36/0072; H04W 36/00837; H04W 88/14
See application file for complete search history.

(56) References Cited

U.S. PATENT DOCUMENTS

| 2014/0335861 A1* | 11/2014 | De Benedittis ... H04W 36/0061 455/436 |
| 2016/0066242 A1* | 3/2016 | Su ..................... H04W 36/0085 455/436 |
| 2016/0150450 A1* | 5/2016 | Balasubramanian ....................... H04W 4/023 370/331 |
| 2019/0335376 A1* | 10/2019 | Huang .................. H04W 24/10 |

(Continued)

FOREIGN PATENT DOCUMENTS

WO    WO-2020100053 A1 *  5/2020

OTHER PUBLICATIONS

International Search Report and Written Opinion—PCT/US2022/072353—ISA/EPO—dated Aug. 5, 2022.

(Continued)

*Primary Examiner* — Ashley Shivers
(74) *Attorney, Agent, or Firm* — ArentFox Schiff LLP

(57) ABSTRACT

Example aspects include a method, apparatus, and computer-readable medium for network-triggered reestablishment by a network node of a wireless communication network, comprising transmitting, to a user equipment (UE) in a connected state with a first central unit (CU), an indication to perform a radio resource control (RRC) reestablishment procedure with a second CU. The indication comprises a reestablishment cell identifier. The aspects further include performing the RRC reestablishment procedure with the UE to transfer the UE from the first CU to the second CU using the reestablishment cell identifier.

28 Claims, 12 Drawing Sheets

(56) References Cited

U.S. PATENT DOCUMENTS

| | | | | |
|---|---|---|---|---|
| 2020/0015088 | A1* | 1/2020 | Luo | H04W 12/041 |
| 2021/0176692 | A1* | 6/2021 | Rugeland | H04W 36/0072 |
| 2021/0211952 | A1* | 7/2021 | Teyeb | H04W 76/15 |
| 2021/0329723 | A1* | 10/2021 | Teyeb | H04W 12/037 |
| 2022/0141732 | A1* | 5/2022 | Wu | H04W 36/0077 |
| | | | | 370/331 |
| 2022/0151006 | A1* | 5/2022 | Muhammad | H04L 45/28 |
| 2022/0182903 | A1* | 6/2022 | Ishii | H04W 36/0058 |

OTHER PUBLICATIONS

Samsung: "Overview on IAB Node Reestablishment", 3GPP TSG-RAN WG3 Meeting #103bis, R3-191556_IABREEST_V1.0, 3rd Generation Partnership Project, Mobile Competence Centre, 650, Route Des Lucioles, F-06921 Sophia-Antipolis Cedex, France, vol. RAN WG3, No. Xi'an, China, Apr. 8, 2019-Apr. 12, 2019, Apr. 6, 2019, XP051702830, 3 Pages, Section 2.3, Figure 1.

Zte et al., "Discussion on IAB BH RLF Handling", 3GPP TSG RAN WG2 Meeting #107bis, R2-1912589, 3rd Generation Partnership Project, Mobile Competence Centre, 650, Route Des Lucioles, F-06921 Sophia-Antipolis Cedex, France, vol. RAN WG2, No. Chongqing, China, 20191014-201910183, Oct. 2019, XP051790630, 5 Pages, Paragraph before Proposal 4.

Zte et al., "Discussion on IAB RLF and IAB Reestablishment", 3GPP TSG RAN WG3 Meeting #105bis, R3-195685, 3rd Generation Partnership Project, Mobile Competence Centre, 650, Route Des Lucioles, F-06921 Sophia-Antipolis Cedex, France, vol. RAN WG3, No. Chongqing, China, Oct. 14, 2019-Oct. 18, 2019, Oct. 4, 2019, XP051809949, 7 Pages, Section 2.4, Figure 1.

* cited by examiner

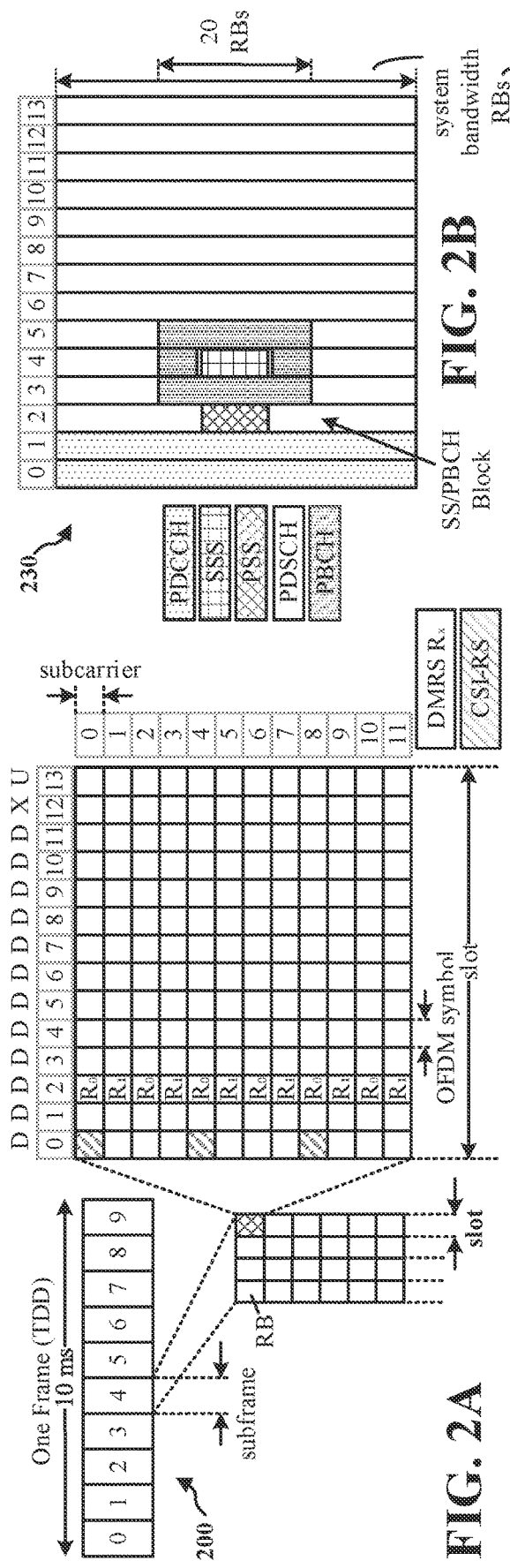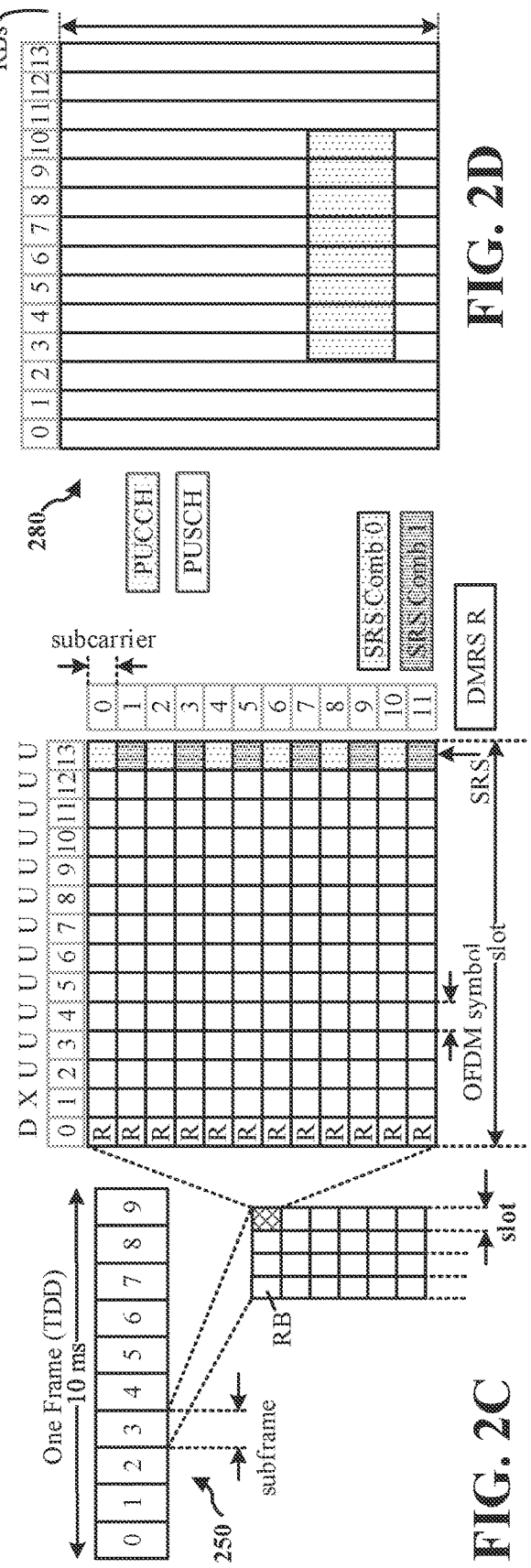

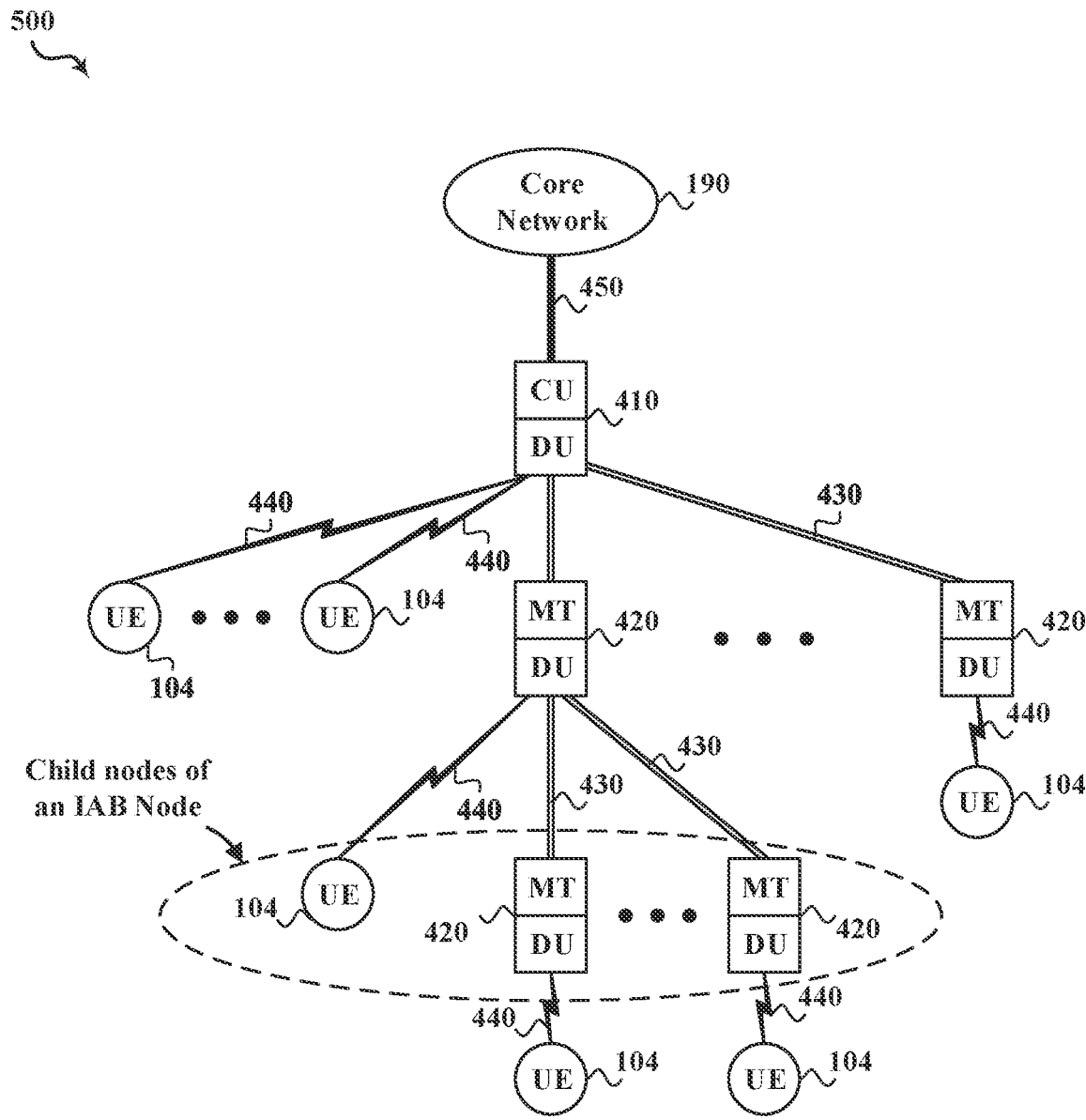
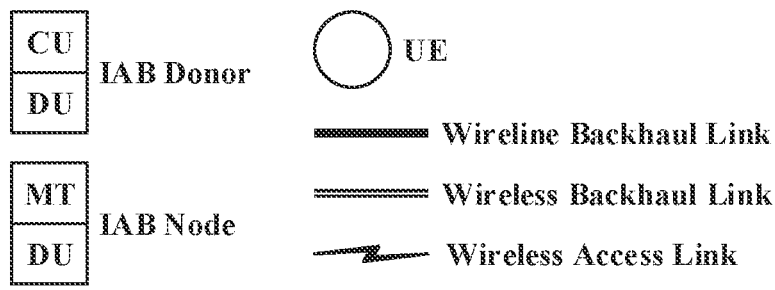
FIG. 5

ENHANCED REESTABLISHMENT PROCEDURE IN INTEGRATED ACCESS AND BACKHAUL NODES

BACKGROUND

Technical Field

The described aspects relate generally to wireless communication systems, and more particularly, to apparatuses and methods for enhanced reestablishment procedures in integrated access and backhaul (IAB) nodes.

Introduction

Wireless communication systems are widely deployed to provide various telecommunication services such as telephony, video, data, messaging, and broadcasts. Conventional wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems may perform reestablishment procedures to migrate integrated access and backhaul (IAB) nodes. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of network-triggered reestablishment by a network node of a wireless communication network, comprising transmitting, to a user equipment (UE) in a connected state with a first central unit (CU), an indication to perform a radio resource control (RRC) reestablishment procedure with a second CU. The indication comprises a reestablishment cell identifier. The method further includes performing the RRC reestablishment procedure with the UE to transfer the UE from the first CU to the second CU using the reestablishment cell identifier.

Another example aspect includes an apparatus of network-triggered reestablishment by a network node of a wireless communication network, comprising a memory storing instructions and a processor communicatively coupled with the memory. The processor is configured to execute the instructions to transmit, to a UE in a connected state with a first CU, an indication to perform a RRC reestablishment procedure with a second CU. The indication comprises a reestablishment cell identifier. The processor is further configured to execute the instructions to perform the RRC reestablishment procedure with the UE to transfer the UE from the first CU to the second CU using the reestablishment cell identifier.

Another example aspect includes an apparatus of network-triggered reestablishment by a network node of a wireless communication network, comprising means for transmitting, to a UE in a connected state with a first CU, an indication to perform a RRC reestablishment procedure with a second CU. The indication comprises a reestablishment cell identifier. The apparatus further includes means for performing the RRC reestablishment procedure with the UE to transfer the UE from the first CU to the second CU using the reestablishment cell identifier.

Another example aspect includes a computer-readable medium (e.g., non-transitory computer-readable medium) storing instructions for network-triggered reestablishment by a network node of a wireless communication network, executable by a processor, to transmit, to a UE in a connected state with a first CU, an indication to perform a RRC reestablishment procedure with a second CU. The indication comprises a reestablishment cell identifier. The instructions are further executable to perform the RRC reestablishment procedure with the UE to transfer the UE from the first CU to the second CU using the reestablishment cell identifier.

Another example aspect includes a method of network-triggered reestablishment by a UE of a wireless communication network, comprising receiving, from a network node, an indication to perform a RRC reestablishment procedure with a second CU. The UE is in a connected state with a first CU. The indication comprises a reestablishment cell identifier. The method further includes performing, in response to receiving the indication, the RRC reestablishment procedure with the network node to transfer the UE from the first CU to the second CU using the reestablishment cell identifier.

Another example aspect includes an apparatus of network-triggered reestablishment by a UE of a wireless communication network, comprising a memory storing instructions and a processor communicatively coupled with the memory. The processor is configured to execute the instructions to receive, from a network node, an indication to perform a RRC reestablishment procedure with a second CU. The UE is in a connected state with a first CU. The indication comprises a reestablishment cell identifier. The processor is further configured to execute the instructions to perform, in response to receiving the indication, the RRC reestablishment procedure with the network node to transfer the UE from the first CU to the second CU using the reestablishment cell identifier.

Another example aspect includes an apparatus of network-triggered reestablishment by a UE of a wireless communication network, comprising means for receiving, from a network node, an indication to perform a RRC reestablishment procedure with a second CU. The UE is in a connected state with a first CU. The indication comprises a reestablishment cell identifier. The apparatus further includes means for performing, in response to receiving the indication, the RRC reestablishment procedure with the network node to transfer the UE from the first CU to the second CU using the reestablishment cell identifier.

Another example aspect includes a computer-readable medium (e.g., non-transitory computer-readable medium) storing instructions for network-triggered reestablishment by a UE of a wireless communication network, executable by a processor, to receive, from a network node, an indication to perform a RRC reestablishment procedure with a second CU. The UE is in a connected state with a first CU. The indication comprises a reestablishment cell identifier. The instructions are further executable to perform, in response to receiving the indication, the RRC reestablishment procedure with the network node to transfer the UE from the first CU to the second CU using the reestablishment cell identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 5 is a block diagram illustrating an example of an IAB network, in accordance with various aspects of the present disclosure.

DETAILED DESCRIPTION

Figure 1:
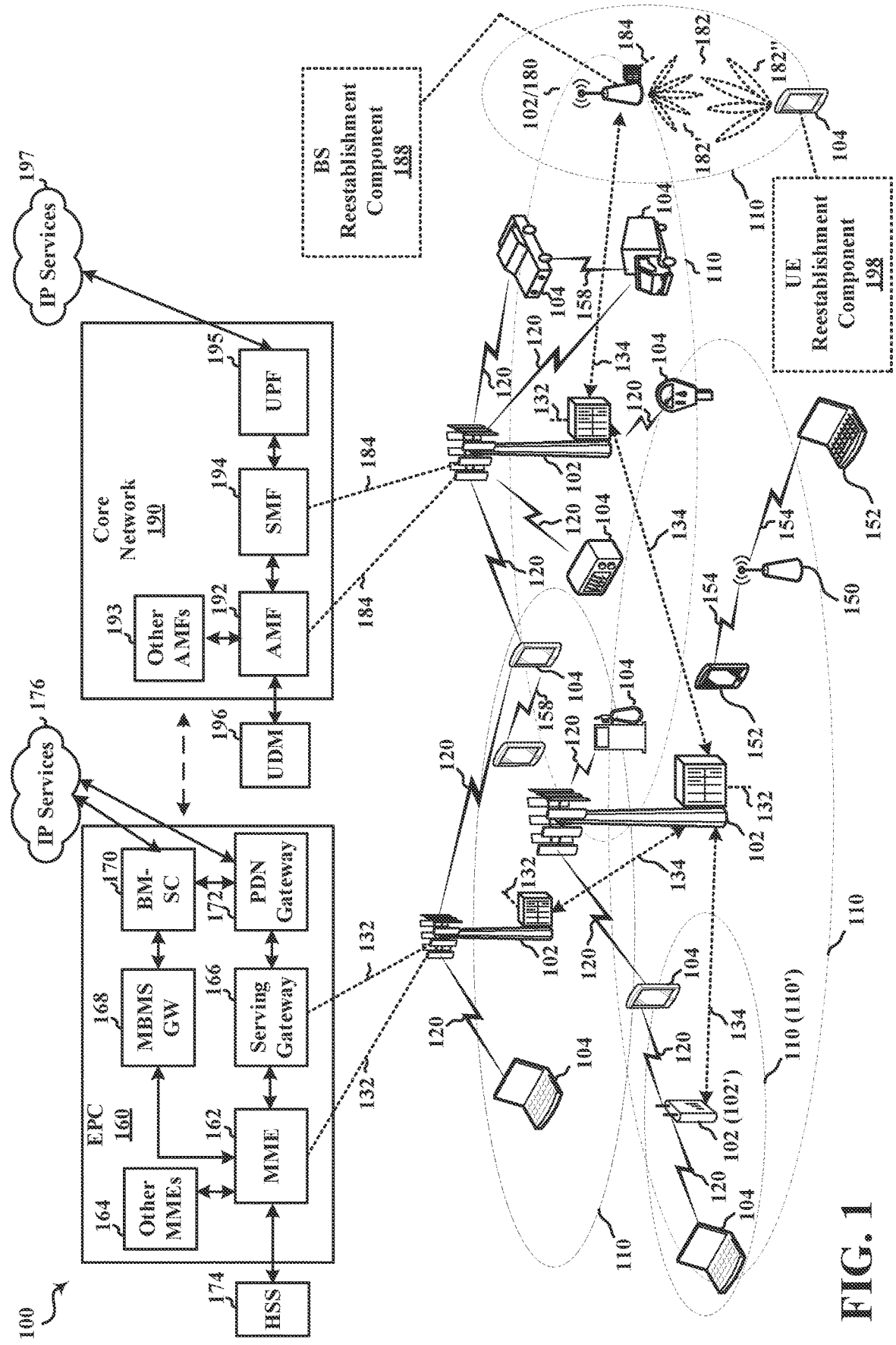
FIG. 1 is a diagram illustrating an example of a wireless communication system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some aspects, wireless communication systems may perform reestablishment procedures initiated by a user equipment (UE) to migrate the UE from one network device (e.g., base station, integrated access and backhaul (IAB) donor) to another network device. In other aspects, wireless communication systems may perform handover procedures initiated by a network device to handover a UE from one network device to another. However, conventional techniques do not address procedures for a network device to initiate a reestablishment procedure of an integrated access and backhaul (IAB) node (e.g., UE) from one IAB donor (e.g., base station) to another IAB donor.

Aspects presented herein provide for multiple manners for performing network-triggered reestablishment from one IAB donor to another IAB donor. In some aspects, a network node (e.g., an IAB node) may transmit an indication to perform a RRC reestablishment procedure. In other aspects, the indication may comprise a RRC reestablishment message. Further, aspects presented herein may reduce complexity and increase efficiency of the wireless communication system, when compared to a conventional communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the base station 102 may include a base station (BS) reestablishment component 188. The BS reestablishment component 188 may be configured to perform a network-triggered reestablishment procedure with a UE 104. For example, the BS reestablishment component 188 may transmit, an indication to perform a RRC reestablishment procedure.

Similarly, the UE 104 may include a UE reestablishment component 198. The UE reestablishment component 198 may be configured to perform a network-triggered reestablishment procedure with a network node (e.g., base station 102). For example, the UE reestablishment component 198 may receive an indication to perform a RRC reestablishment procedure.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunication System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (186 MHz–7.125 GHz) and FR2 (24.25 GHz–52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz–300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2_\mu$ slots/subframe. The subcarrier spacing and symbol length/duration are a function of the numerology. The subcarrier spacing may be equal to $2_\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. In such an example, the slot duration may be 0.25 milliseconds, the subcarrier spacing may be 60 kHz, and the symbol duration may be approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_X$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
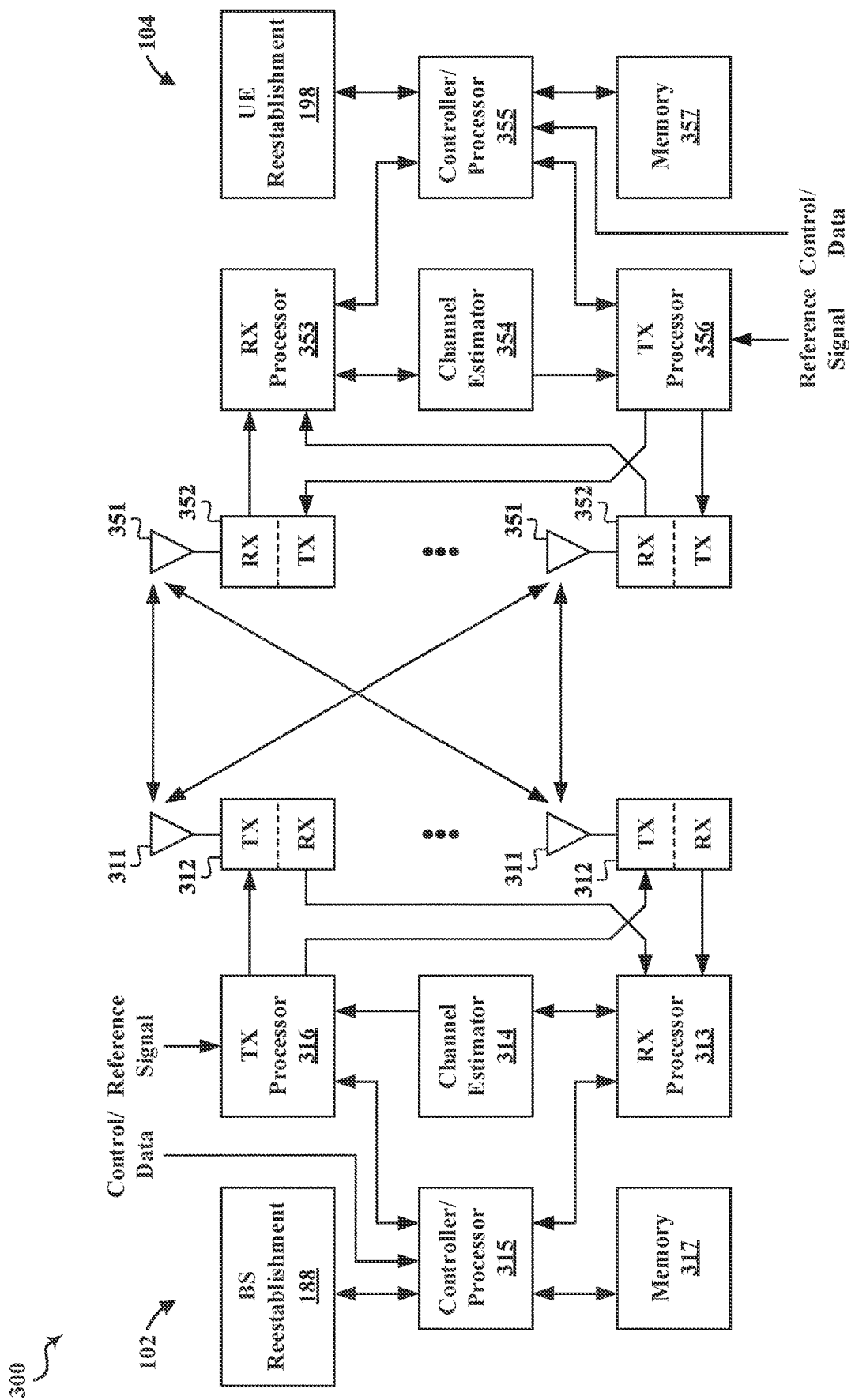
FIG. 3 is a diagram illustrating an example of hardware components of the base station and the user equipment (UE) in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may include a BS reestablishment component 188. The BS reestablishment component 188 may be configured to perform a network-triggered reestablishment procedure with a UE 104. For example, the BS reestablishment component 188 may transmit, an indication to perform a RRC reestablishment procedure.

In other aspects, at least one of the TX processor 316, the RX processor 313, and the controller/processor 315 may be configured to perform aspects in connection with the BS reestablishment component 188 of FIG. 1. For example, the memory 317 may store computer-executable instructions defining the BS reestablishment component 188. In other aspects, the TX processor 316, the RX processor 313, and/or the controller/processor 315 may be configured to execute the BS reestablishment component 188.

In some aspects, the UE 104 may include a UE reestablishment component 198. The UE reestablishment component 198 may be configured to perform a network-triggered reestablishment procedure with a network node (e.g., base station 102). For example, the UE reestablishment component 198 may receive an indication to perform a RRC reestablishment procedure.

In other aspects, at least one of the TX processor 356, the RX processor 353, and the controller/processor 355 may be configured to perform aspects in connection with the UE reestablishment component 198 of FIG. 1. For example, the memory 357 may store computer-executable instructions defining the UE reestablishment component 198. In other aspects, the TX processor 356, the RX processor 353, and/or the controller/processor 355 may be configured to execute the UE reestablishment component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
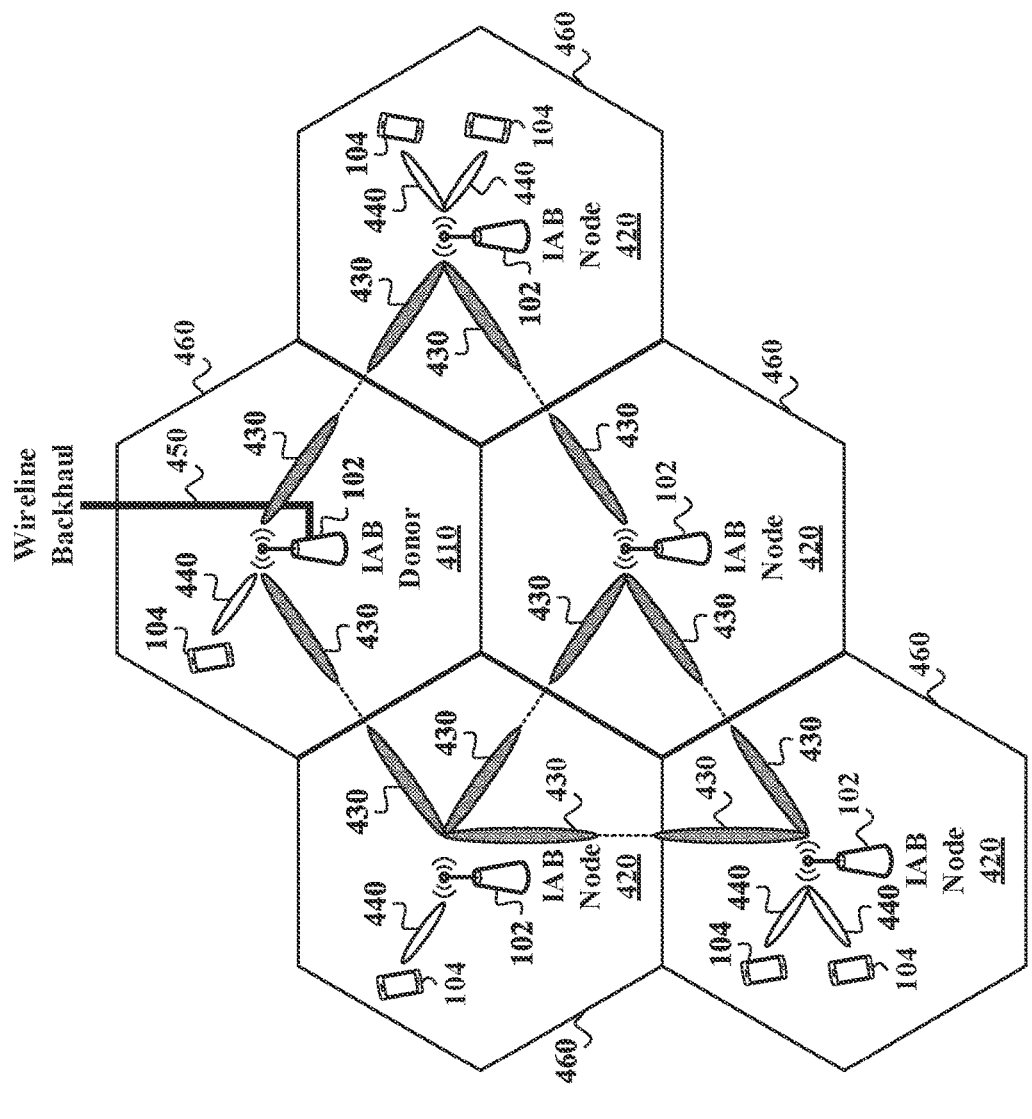
FIG. 4 is a diagram illustrating an example of an integrated access and backhaul (IAB) network, in accordance with various aspects of the present disclosure.

FIG. 4 is a diagram illustrating an example of an integrated access and backhaul (IAB) network 400. The IAB network 400 may comprise one or more network devices 102 providing core network access to one or more UEs 104. The architecture of the IAB network 400 depicted in FIG. 4 may be similar in many respects to the architecture of the wireless communication system and an access network 100 described above with reference to FIG. 1 and may include additional features not mentioned above. Some of the elements of the wireless communication system and an access network 100 described above have been omitted for the sake of simplicity.

The network devices 102 depicted in FIG. 4 may be similar in many respects to the network devices (e.g., base station 102, gNB 180) described above in reference to FIGS. 1 and 3, and may include additional features not mentioned above. The network devices 102 may comprise a BS reestablishment component 188 (shown in FIGS. 1 and 3). The UEs 104 depicted in FIG. 4 may be similar in many respects to the UE 104 described above in reference to FIGS. 1 and 3, and may include additional features not mentioned above. The UEs 104 may comprise a UE reestablishment component 198 (shown in FIGS. 1 and 3).

In some aspects, network devices 102 may operate in a mmW radio frequency band (e.g., FR2 (24.25 GHz–52.6 GHz)) and, as such, may have a smaller coverage area 460 when compared to other network nodes operating at other radio frequency bands. That is, a high path loss and a short range associated with the mmW radio frequency band may result in a smaller cell service area for each network device 102. Thus, a network operator may need to deploy a larger number of network devices 102 to provide coverage to a particular geographic area. However, network devices 102 may conventionally have a corresponding wireline backhaul connection 450 to a core network (e.g., core network 190 of FIG. 1), such as an optical fiber connection. As a result, deployment of the network devices 102 using the mmW radio frequency band may be significantly more complex than deployment of other network nodes using other radio frequency bands due to the larger number of wireline backhaul connections 450 that may be required.

In other aspects, as shown in FIG. 4, a portion of the network nodes 102 of the IAB network 400 may comprise the wireline backhaul connection 450. Such network nodes 102 may be generally referred to as IAB donors 410. That is, a subset of the network nodes 102 of the IAB network 400 may be deployed with a wireline backhaul connection 450 to the core network. The IAB donors 410 may be configured to provide core network access to the IAB nodes 420 via one or more wireless backhaul links 430 and/or to the UEs 104 via one or more wireless access links 440. Alternatively or additionally, a remaining portion of the network nodes 102 may obtain access to the core network via the one or more wireless backhaul links 430. Such network nodes 102 may be generally referred to as IAB nodes 420. That is, the IAB nodes 420 may access the core network via the one or more wireless backhaul links 430 and/or provide core network access to the UEs 104 via the one or more wireless access links 440. For example, one or more IAB nodes 420 may relay core network traffic between an IAB donor 410 and/or one or more hops (e.g., IAB nodes 420).

In other aspects, the IAB network 400 may be configured to share resources between the wireless backhaul links 430 and the wireless access links 440. That is, resources and/or framework for the access network may be reused for the backhaul network.

It may be understood that the IAB network 400 depicted in FIG. 4 is only one example of an IAB network that may be utilized without departing from the scope described herein. For example, other IAB network topologies comprising different amounts of IAB donors 410, IAB nodes 420, and/or UEs 104 may be utilized.

FIG. 5 is a block diagram illustrating an example of an IAB network 500. The IAB network 500 may comprise at least one IAB donor 410 providing core network access to one or more UEs 104 and to one or more IAB nodes 420. The architecture of the IAB network 500 depicted in FIG. 5 may be similar in many respects to the architecture of the wireless communication system and an access network 100 described above with reference to FIG. 1 and to the IAB network 400 described above with reference to FIG. 4 and may include additional features not mentioned above. Some of the elements of the wireless communication system and an access network 100 and of the IAB network 400 described above have been omitted for the sake of simplicity.

The IAB donor 410 depicted in FIG. 5 may be similar in many respects to the network devices (e.g., base station 102, gNB 180) described above in reference to FIGS. 1 and 3-4 and to the IAB donor 410 described above in reference to FIG. 4, and may include additional features not mentioned above. The IAB donor 410 may comprise a BS reestablishment component 188 (shown in FIGS. 1 and 3). The UEs 104 depicted in FIG. 5 may be similar in many respects to the UE 104 described above in reference to FIGS. 1 and 3-4, and may include additional features not mentioned above. The UEs 104 may comprise a UE reestablishment component 198 (shown in FIGS. 1 and 3).

In some aspects, the IAB donor 410 may be configured to control the IAB network 500. That is, the IAB donor 410 may be configured to control configuration and/or communication between the IAB nodes 420 and/or the UEs 104 of the IAB network 500 over the wireless backhaul links 430 and/or the wireless access links 440. In other aspects, the IAB donor 410 may implement a split protocol architecture in which protocol stacks may be split across multiple components based on functionality. For example, a protocol stack split may into a lower protocol stack for resource scheduling and an upper protocol stack for resource control.

The IAB donor 410 may comprise a central unit (CU) that may control the IAB network 500 using device configuration. That is, the CU may determine one or more configurations for the IAB nodes 420 and/or the UEs 104 of the IAB network 500. For example, the CU may comprise radio resource control (RRC) layer functionality and/or packet data convergence protocol (PDCP) layer functionality. Alternatively or additionally, the IAB donor 410 may comprise a distributed unit (DU) that may schedule child IAB nodes 420 and/or child UEs 104 of the IAB donor 410. For example, the DU may comprise radio link control (RLC) layer functionality, medium access control (MAC) layer functionality, and/or physical (PHY) layer functionality. The CU of the IAB donor 410 may communicate with the DU of the IAB donor 410 and/or the DU of an IAB node 420 using an F1 connection.

The IAB nodes 420 depicted in FIG. 5 may be similar in many respects to the network devices (e.g., base station 102, gNB 180) described above in reference to FIGS. 1 and 3-4 and to the IAB nodes 420 described above in reference to FIG. 4, and may include additional features not mentioned above. The IAB nodes 420 may comprise a BS reestablishment component 188 (shown in FIGS. 1 and 3).

In some aspects, the IAB nodes 420 may comprise a Layer 2 (L2) relay node providing mobile termination (MT) and/or DU functionality. For example, an MT component of the IAB node 420 may be scheduled in a manner similar to a UE 104 being scheduled by a parent IAB node 420 and/or a parent IAB donor 410. Alternatively or additionally, the DU of the IAB node 410 may schedule child IAB nodes 420 and/or child UEs 104 of the IAB node 420. For example, the DU may comprise RLC layer functionality, MAC layer functionality, and/or PHY layer functionality. In other aspects, the IAB node 420 may comprise a plurality of logical DUs. Each logical DU may correspond to a connection (e.g., F1) with a CU of an IAB donor 410. For example, an IAB node 420 may comprise a first logical DU corresponding to a first F1 connection with a CU of a first IAB donor 410 and may comprise a second logical DU corresponding to a second F1 connection with a CU of a second IAB donor 410.

It may be understood that the IAB network 500 depicted in FIG. 5 is only one example of an IAB network that may be utilized without departing from the scope described herein. For example, other IAB network topologies comprising different amounts of IAB donors 410, IAB nodes 420, and/or UEs 104 may be utilized.

Aspects presented herein provide for multiple manners to perform a network-initiated RRC connection reestablishment procedure. In some aspects, the IAB network 500 may transmit an indication to a child node (e.g., IAB node 420, UE 104) requesting to initiate a conventional RRC reestablishment procedure. In other optional or additional aspects, the IAB network 500 may transmit a RRC reestablishment message to the child node without the child node having transmitted a RRC reestablishment request message. That is, the IAB network 500 may cause the child node to initiate the RRC connection reestablishment procedure.

In some aspects, an IAB donor 410 of the IAB network 500 may need to migrate (e.g., transfer) a child node (e.g., IAB node 420, UE 104) to another IAB donor 410. That is, an inter-donor IAB node migration procedure may be required. For example, a stationary IAB node located near a coverage boundary between two IAB donors may need to migrate from a serving IAB donor to a target IAB donor if or when a performance quality of a link to the serving IAB donor declines below a threshold. In another example, a mobile IAB node may move from a coverage area of a serving IAB node associated with the serving IAB donor to a coverage area of a target IAB node associated with the target IAB donor. In another example, the IAB node may be migrated from a first IAB donor to a second IAB donor to potentially achieve a load balancing goal between the two IAB donors. Conventional wireless communication systems may perform a network-initiated handover procedure to effect the transfer of the child node. However, as described in further detail below in reference to FIG. 8, the network-initiated reestablishment procedure may require two simultaneous F1 connections between a parent IAB node of the child node and the two IAB donors. As such, the network-initiated reestablishment procedure may not be performed if or when the parent IAB node does not support multiple F1 connections. For example, the IAB network 500 may have been configured the parent IAB node to prevent multiple F1 connections.

Advantageously, aspects presented herein allow for network-initiated RRC connection reestablishment procedures to be performed using a single F1 connection between the parent IAB node and the second IAB donor, as described in further detail below.

Figure 6:
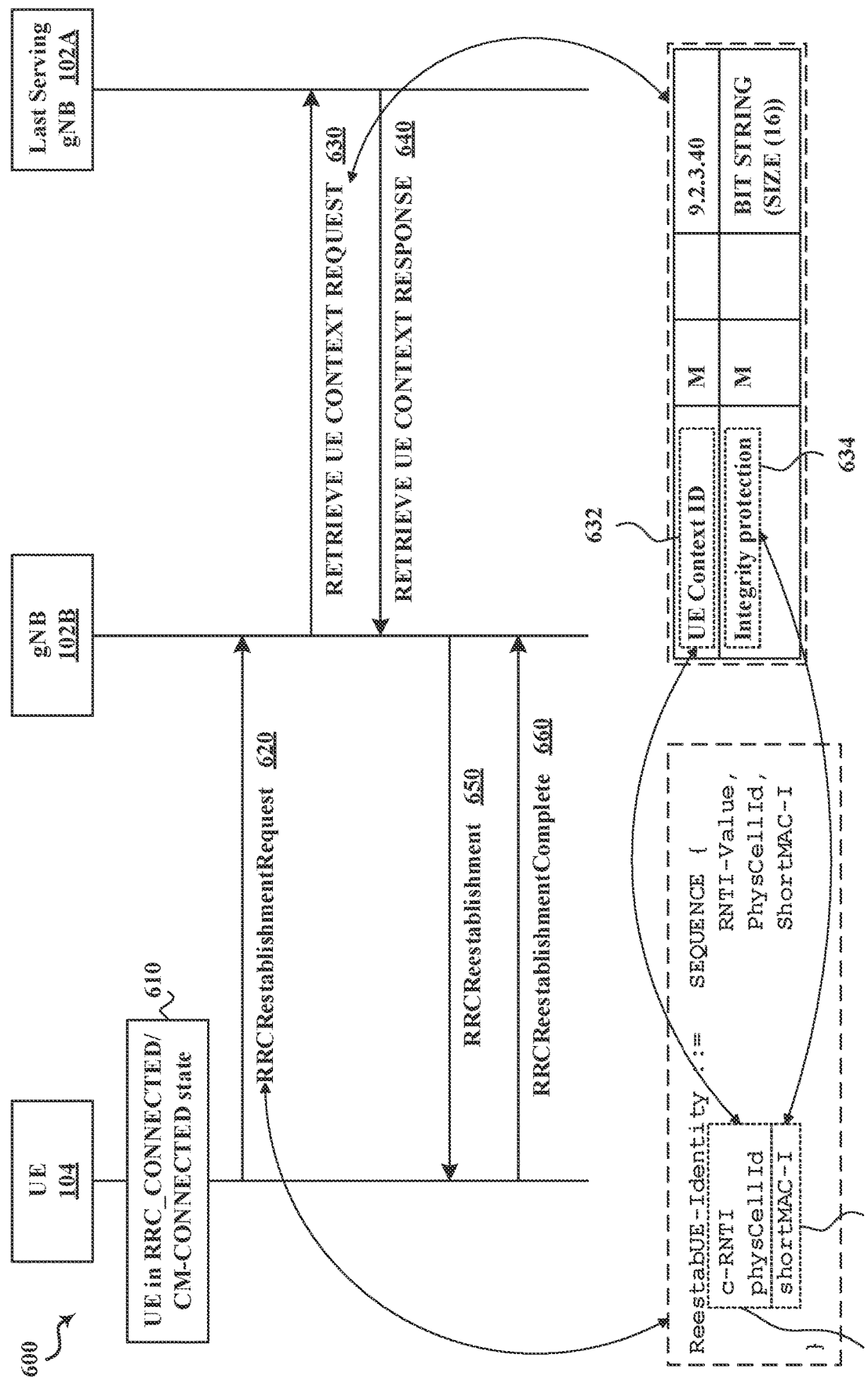
FIG. 6 illustrates an example of a call flow diagram for a UE-initiated reestablishment procedure, in accordance with various aspects of the present disclosure.

FIG. 6 illustrates a call flow diagram 600 of an example of a UE-initiated reestablishment procedure between a UE 104, a gNB 102B, and a last serving gNB 102A. The UE 104 may include a UE reestablishment component 198. The gNB 102B and the last service gNB 102A may include a BS reestablishment component 188. Alternatively or additionally, the UE 104 may be a child node (e.g., IAB node 420) of a IAB network (e.g., IAB networks 400, 500 of FIGS. 4-5, respectively), the last serving gNB 102A may be a parent IAB node of the child node, and the gNB 102B may a IAB node connected to the second IAB donor, as described above in reference to FIG. 5.

The UE 104 may, at 610, be in a connected state (e.g., RRC CONNECTED, CM-CONNECTED) if or when the UE 104 determines to initiate a reestablishment procedure to maintain a RRC connection. The UE 104 may determine to initiate the reestablishment procedure in response to detecting a connection failure condition (e.g., radio link failure, reconfiguration failure, integrity check failure, and the like).

Prior to entering an idle state, the UE 104 may, at 620, initiate the reestablishment procedure by transmitting a RRC reestablishment request message to a selected target cell (e.g., gNB 102B). That is, as part of the reestablishment procedure, the UE 104 may select a new target cell for reestablishing the connection. In some aspects, the selected target cell may be served by a same gNB 102 (e.g., gNB 102A) as the current serving cell. Alternatively or additionally, the selected target cell may be served by a different gNB 102 (e.g., gNB 102B) as the current serving gNB 102A.

In response to receiving the RRC reestablishment request, the gNB 102B may, at 630, transmit a UE context request of the UE 104 to the last serving gNB 102A if or when the UE context is not locally available to the gNB 102B. For example, the UE context may be locally available to the gNB 102B if or when the UE 104 has previously connected to the gNB 102B. Alternatively or additionally, the UE context may not be locally available to the gNB 102B if or when the UE 104 has not previously connected to the gNB 102B.

At 640, in response to receiving the UE context request, the last serving gNB 102A may respond to the request by transmitting the requested UE context information to the gNB 102B. The UE context information may comprise information necessary to maintain services of the UE 104. For example, the UE context information may comprise at least one of UE state information, security information, UE capability information, and UE identity information associated with the corresponding gNB 102.

The gNB 102B may transmit a RRC reestablishment message, at 650, to the UE 104 indicating that the RRC reestablishment request has been accepted. In some aspects, the RRC reestablishment message may comprise an integrity protection value that the UE 104 may utilize to verify the integrity of the RRC reestablishment message. Alternatively or additionally, the gNB 102B may transmit the RRC reestablishment message without encoding and/or encryption to allow the UE 104 to read and process the content of the RRC reestablishment message.

At 660, the UE 104 may transmit a RRC reestablishment complete message to the gNB 102B indicating that the UE 104 has successfully completed the RRC reestablishment procedure. That is, the RRC reestablishment complete message may indicate that the UE 104 has successfully verified the integrity of the RRC reestablishment message and that the UE 104 has updated a security information (e.g., encryption information, integrity protection information) of the UE 104 using information comprised by the RRC reestablishment message. In some aspects, the RRC reestablishment complete message may comprise an integrity protection value and may be encrypted using the updated security information. Alternatively or additionally, the RRC reestablishment complete message may be transmitted over a signaling radio bearer (e.g., SRB) associated with RRC messages that use a downlink control channel (DCCH) (e.g., SRB1).

Continuing to refer to FIG. 6, the RRC reestablishment request message transmitted, at 620, by the UE 104 to the gNB 102B may comprise UE identity information 622 corresponding to the last serving gNB 102A. For example, the UE identity information may comprise a cell radio network temporary identifier (C-RNTI) and/or a physical cell identification (PCI) that correspond to UE identity information obtained from the last serving gNB 102 of the UE 104. Alternatively or additionally, the RRC reestablishment request message may comprise integrity protection information 624, such as a short message authentication code—integrity (shortMAC-I). In some aspects, the UE 104 may generate the integrity protection information 624.

The gNB 102B receiving the RRC reestablishment request message may utilize the UE identity information 622 and the integrity protection information 624 to identify the UE 104 that transmitted the RRC reestablishment request message. For example, the UE context request message transmitted, at 630, by the gNB 102B to the last serving gNB 102A may comprise UE context identification information 632 that corresponds to the UE identity information 622. Alternatively or additionally, the UE context request message may comprise integration protection information 634 that corresponds to the integrity protection information 624.

The last serving gNB 102A may identify the UE context corresponding to the UE 104 based on the UE context identification information 632. The last serving gNB 102A may verify the identity of the UE 104 based on the integrity protection information 624. The last serving gNB 102A may be configured to provide the UE context corresponding to the UE 104 to the gNB 102B. That is, as discussed above in reference to step 640, the last serving gNB 102A may respond to the UE context request by transmitting the requested UE context information to the gNB 102B.

Thus, the call flow diagram 600 represents one example of a UE 104 initiating a RRC reestablishment procedure to switch from one serving cell to another serving cell in response to detecting a connection failure.

Figure 7:
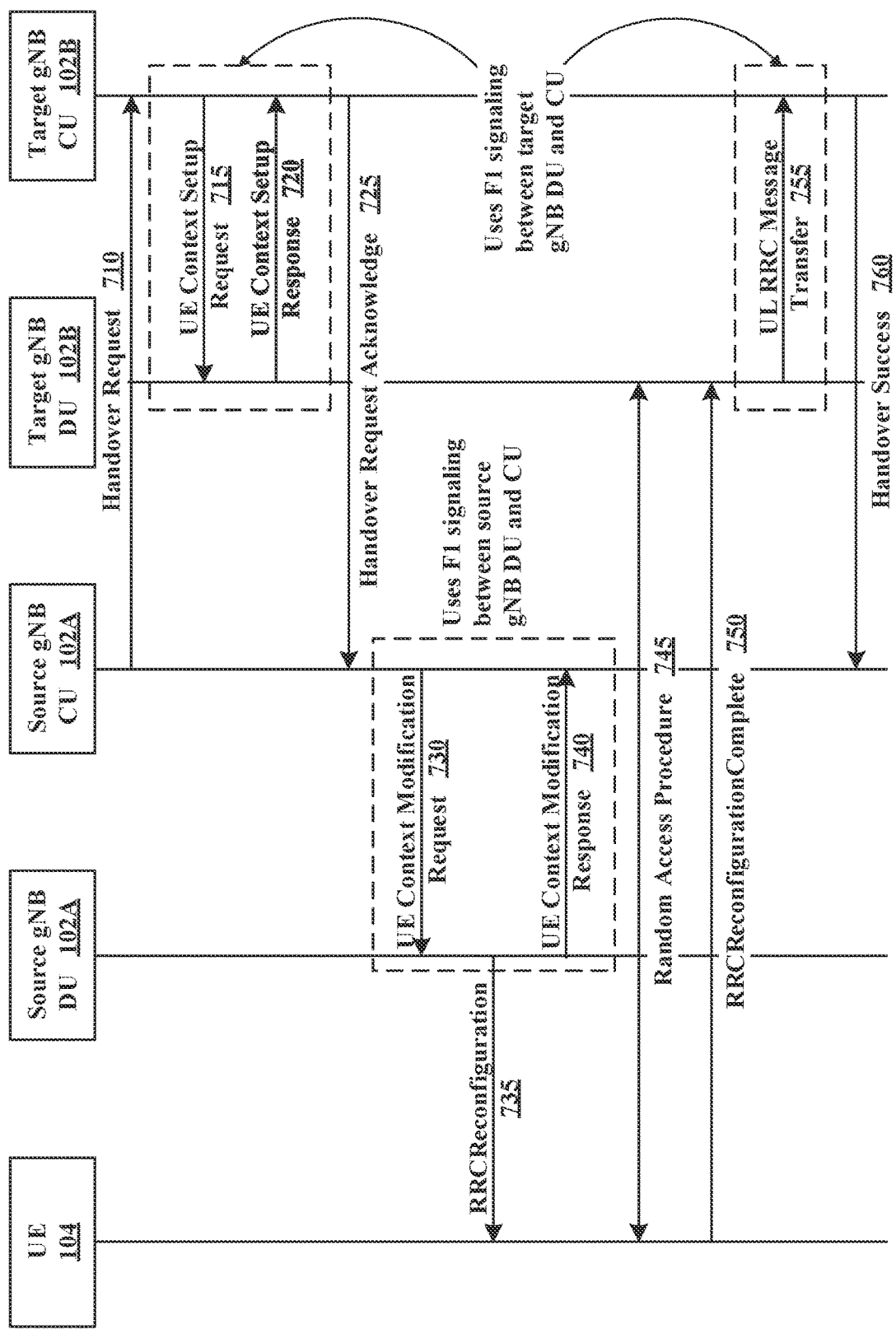
FIG. 7 illustrates an example of a call flow diagram for a network-initiated UE handover procedure, in accordance with various aspects of the present disclosure.

FIG. 7 illustrates a call flow diagram 700 of an example of a network-initiated UE handover procedure between a UE 104, a source gNB 102A, and a target gNB 102B. The UE 104 may include a UE reestablishment component 198. The source gNB 102A and the target gNB 102B may include a BS reestablishment component 188. Alternatively or additionally, the UE 104 may be a child node (e.g., IAB node 420) of a IAB network (e.g., IAB networks 400, 500 of FIGS. 4-5, respectively), the source gNB 102A may be a first IAB donor 410, and the target gNB 102B may a second IAB donor 410, as described above in reference to FIG. 5.

At 710, the CU of the source gNB 102A may transmit a handover request to the CU of the target gNB 102B in response to a determination that the UE 104 is to be transferred (e.g., migrated) from the source gNB 102A to the target gNB 102B. For example, the determination to perform the handover procedure may be based on a determination that a signal quality between the UE 104 and the source gNB 102A does not meet a certain quality threshold. For example, the handover procedure may be determined to be performed if or when a signal-to-noise ratio (SNR) of the received signal from the UE 104 falls below a minimum SNR threshold. In another example, the determination may be based on another determination that a processing load (e.g., processor load, memory load) of the source gNB 102A exceeds a certain processing threshold.

The CU of the target gNB 102B may, at 715, establish a context for the UE 104 by transmitting a UE context setup request to the DU of the target gNB 102B. The CU of the target gNB 102B may use F1 signaling to transmit the UE context setup request to the DU of the target gNB 102B. The DU of the target gNB 102B may respond to the request by transmitting a UE context setup response, at 720, with the UE context information of the UE 104. The DU of the target gNB 102B may use F1 signaling to transmit the UE context setup response to the CU of the target gNB 102B. Alternatively or additionally, the DU of the target gNB 102B may determine whether the target gNB 102B comprises sufficient resources (e.g., wireless access resources, wireless backhaul resources, processing resources) for the UE 104.

At 725, the CU of the target gNB 102B may transmit an acknowledgment of the handover request message to the CU of the source gNB 102A. The acknowledgment may indicate that the target gNB 102B has accepted the handover request. Alternatively or additionally, the acknowledgement may comprise a handover command (e.g., RRC reconfiguration message) to be sent to the UE 104A by the CU of the source gNB 102A via the DU of the source gNB 102A.

The CU of the source gNB 102A may, at 730, transmit a UE context modification request to the DU of the source gNB 102A using F1 signaling. The UE context modification request may comprise the handover command (e.g., RRC reconfiguration message) to be sent to the UE 104A. Alternatively or additionally, the UE context modification request may indicate to the DU of the source gNB 102A to stop scheduling the UE 104.

At 735, the DU of the source gNB 102A may transmit an RRC reconfiguration message to the UE 104 instructing the UE 104 to transfer to the target gNB 102B. At 740, the DU of the source gNB 102A may transmit a UE context modification response to the CU of the source gNB 102A using F1 signaling. The UE context modification response may acknowledge the UE context modification request and indicate that the UE 104 has been instructed to transfer to the target gNB 102B.

In response to receipt of the RRC reconfiguration message, the UE 104 may perform, at 745, a random access procedure with the DU of the target gNB 102B in order to synchronize with the target gNB 102B and to establish a connection with the target gNB 102B.

At 750, upon completion of the random access procedure, the UE 104 may further transmit a RRC reconfiguration complete message to the DU of the target gNB 102B indicating that the UE 104 has successfully connected to the target gNB 102B and applied a configuration comprised by the handover command.

The DU of the target gNB 102B may transmit, at 755, an uplink RRC message transfer (e.g., RRC reconfiguration complete) message to the CU of the target gNB 102B using F1 signaling. The RRC reconfiguration complete message may indicate that the handover was successful. At 760, the CU of the target gNB 102B may transmit a handover success message to the CU of the source gNB 102A indicating that the handover was successful.

Thus, the call flow diagram 700 represents one example of a network-initiated UE handover procedure between a UE 104, a source gNB 102A, and a target gNB 102B. As described in further detail above, the network-initiated UE handover procedure may require two F1 connections, a first F1 connection between the DU and the CU of the target gNB 102B and a second F1 connection between the DU and the CU of the source gNB 102A. As the two F1 connections are between two distinct sets of components, the network-initiated UE handover procedure may be performed without a need for support for simultaneous F1 connections as described above in reference to FIG. 5.

Figure 8:
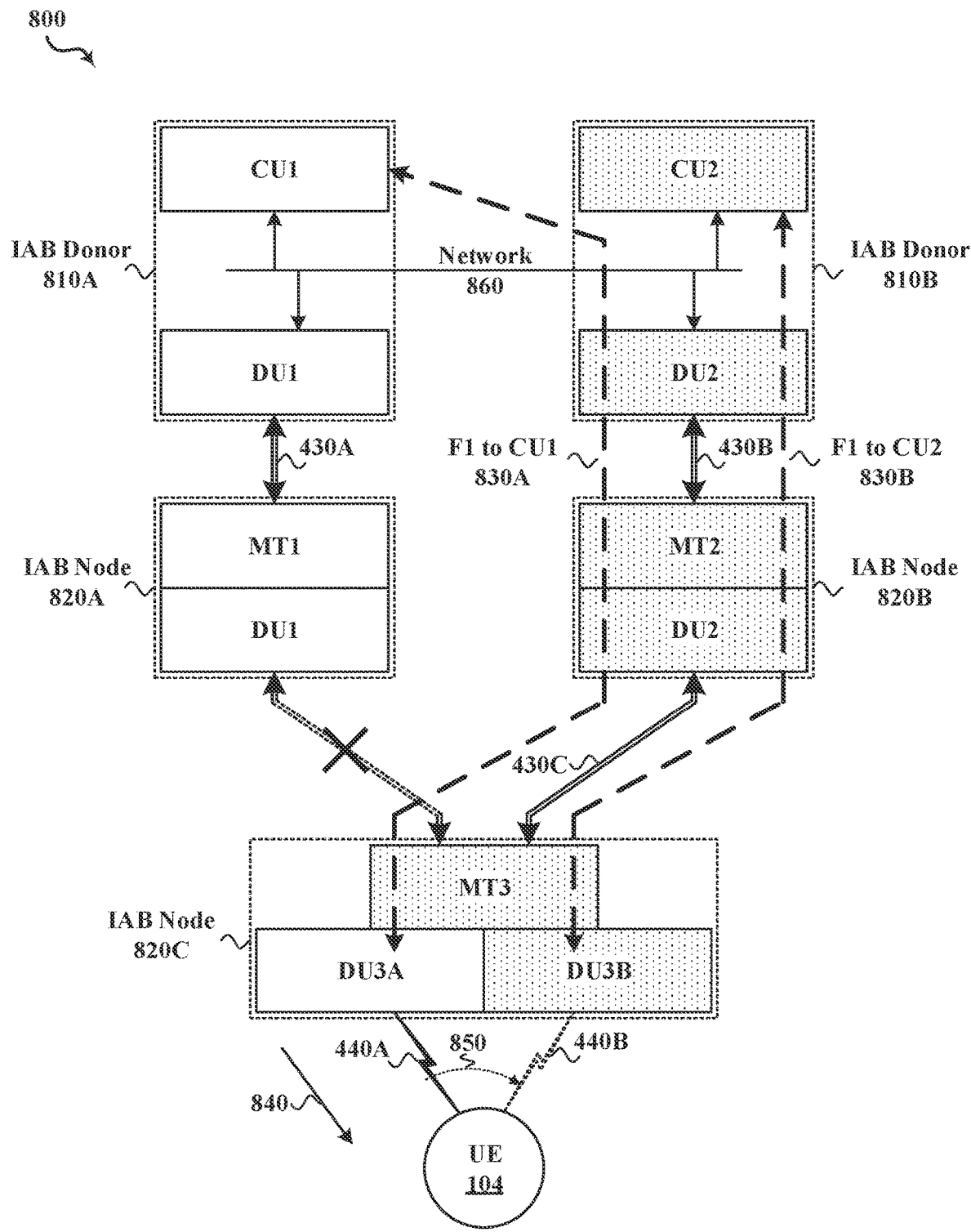
FIG. 8 is a diagram of an example of an inter-donor IAB node migration, in accordance with various aspects of the present disclosure.

FIG. 8 is a diagram illustrating an example of an inter-donor IAB node migration 800. The IAB network 800 may comprise IAB donors 810A, 810B (hereinafter, "810"), IAB nodes 820A, 820B, 820C (hereinafter, "820"), and UE 104. The architecture of the IAB network 800 depicted in FIG. 8 may be similar in many respects to the architecture of the wireless communication system and an access network 100 described above with reference to FIG. 1 and to the IAB networks 400 and 500 described above with reference to FIGS. 4 and 5, respectively, and may include additional features not mentioned above. Some of the elements of the wireless communication system and an access network 100 and of the IAB networks 400 and 500 described above have been omitted for the sake of simplicity.

The IAB donors 810 depicted in FIG. 8 may be similar in many respects to the network devices (e.g., base station 102, gNB 180) described above in reference to FIGS. 1 and 3-4 and to the IAB donors 410 and 510 described above in reference to FIGS. 4 and 5, and may include additional features not mentioned above. The IAB donors 810 may comprise a BS reestablishment component 188 (shown in FIGS. 1 and 3). The IAB nodes 820 depicted in FIG. 8 may be similar in many respects to the network devices (e.g., base station 102, gNB 180) described above in reference to FIGS. 1 and 3-4 and to the IAB nodes 420 described above in reference to FIGS. 4 and 5, and may include additional features not mentioned above. The IAB donors 820 may comprise a BS reestablishment component 188 (shown in FIGS. 1 and 3). The UE 104 depicted in FIG. 8 may be similar in many respects to the UE 104 described above in reference to FIGS. 1 and 3-4, and may include additional features not mentioned above. The UE 104 may comprise a UE reestablishment component 198 (shown in FIGS. 1 and 3). Alternatively or additionally, the UE 104 depicted in FIG. 8 may be another IAB node 820 and may be similar to the IAB nodes 420 described above in reference to FIGS. 4 and 5 (e.g., a child IAB node).

In some aspects, a backhaul link 430C may communicatively couple a third IAB node 820C with a second IAB donor 810B via a second IAB node 820B. For example, MT3 of the third IAB node 820C may connect with DU2 of the second IAB node 820B via an RRC connection, DU3A of the third IAB node 820C may connect with CU1 of the first IAB donor 810A via F1 connection 830A, and DU3B of the third IAB node 820C may connect with CU2 of the second IAB donor 810B via F1 connection 830B. In other aspects, the first IAB node 820A may be communicatively coupled with the first IAB donor 810A via backhaul link 430A and the second IAB node 820B may be communicatively coupled with the second IAB donor 810B via backhaul link 430B. Alternatively or additionally, the first IAB donor 810A and the second IAB donor 810B may be communicatively coupled via network 860.

As shown in FIG. 8, an inter-donor IAB node migration 850 may be performed to transfer the UE 104 from the first IAB donor 810A to the second IAB donor 810B. The UE 104 may be migrated as a result of the third IAB node 820C having been transferred from the first IAB donor 810A to the second IAB donor 810B. For example, the third IAB node 820C may have been transferred in response to a load balancing determination by the IAB network 800. In another example, the third IAB node 820C may comprise a mobile device and the transfer may have been effected in response to a location change of the third IAB node 820C.

In some aspects, the UE 104 may not be transferred from the first IAB donor 810A to the second IAB donor 810B using the network-initiated UE handover procedure as discussed above in reference to FIG. 7. That is, the third IAB node 820C may not have support for dual and/or multiple F1 connections that may be required by the network-initiated UE handover procedure of FIG. 7. For example, as part of the network-initiated UE handover procedure of FIG. 7, the third IAB node 820C may need the first F1 connection 830A to the first (source) IAB donor 810A to perform UE context modification (e.g., 730 and 740 of FIG. 7) and the second F1 connection 830B to the second (second) IAB donor 810B to perform UE context setup (e.g., 715 and 720 of FIG. 7).

Alternatively or additionally, the UE 104 may not be transferred from the first IAB donor 810A to the second IAB donor 810B using the UE-initiated reestablishment procedure as discussed above in reference to FIG. 6. That is, the UE 104 may need to be transferred as a result of the third IAB node 820C being transferred from the first IAB donor 810A to the second IAB donor 810B. As such, the conditions that may trigger the UE-initiated reestablishment procedure (e.g., radio link failure, reconfiguration failure, integrity check failure, and the like) may not be present.

Advantageously, aspects presented herein provide for network-triggered reestablishment procedures, which may be used to perform the inter-donor IAB node migration, and may not require dual and/or multiple F1 connections. As such, the network-triggered reestablishment procedures may be performed by IAB nodes that may not support multiple F1 connections.

In addition, an F1 connection to the previous IAB donor may be interrupted if or when an IAB node migrates to a new IAB donor. As the network-triggered reestablishment procedures presented herein may be performed with only one F1 connection, the IAB node may not need to reestablish the previous F1 connection to the previous IAB donor and may only need to establish the F1 connection to the new IAB donor. Thus, potentially improving efficiency when compared to conventional wireless communication systems.

Further, reestablishment of the previous F1 connection to the previous IAB donor may require rerouting traffic associated with the previous F1 connection across two network topologies (e.g., the network topology of the previous IAB donor and the network topology of the new IAB donor). That is, reestablishment of the previous F1 connection may require coordination between the two IAB donors. Thus, the network-triggered reestablishment procedures presented herein may potentially reduce complexity when compared to conventional wireless communication systems.

In some aspects, the inter-donor IAB node migration may be effected by causing the UE 104 to perform the RRC reestablishment message exchanges described above in reference to FIG. 6. That is, the RRC reestablishment message exchanges may be initiated by a network device (e.g., third IAB node 820C) rather than by the UE 104. For example, the third IAB node 820C may transmit an indication 840 to the UE 104 to perform the RRC reestablishment message exchanges with the second IAB donor 810B. The UE 104 may receive the indication 840 from the third IAB node 820C and initiate the RRC reestablishment message exchanges in response to receiving the indication 840. That is, receiving the indication 840 may trigger the UE 104 to perform the RRC message exchanges of FIG. 6 with the second IAB donor 810B.

The indication 840 from the third IAB node 820C may comprise a reestablishment cell identifier. The reestablishment cell identifier may indicate a physical cell to which the UE 104 is to reestablish. The reestablishment cell identifier may indicate a same cell or a different cell to which the UE 104 is currently connected. Alternatively or additionally, the indication 840 may comprise an instruction to deactivate deciphering for detection of a RRC reestablishment message. That is, the instruction may configure the UE 104 to receive a RRC reestablishment message without encryption.

In some aspects, the indication 840 may be autonomously transmitted by the third IAB node 820C to the UE 104. For example, the third IAB node 820C may transmit the indication 840 to the UE 104 after completing setup of the F1 connection 830B to CU2 of the second IAB donor 810B. Alternatively or additionally, the indication 840 may be transmitted in response to a trigger from CU1 of the first IAB donor 810A and/or a trigger from CU2 of the second IAB donor 810B. For example, the indication 840 may be transmitted in response to a determination by the first IAB donor 810A and/or the second IAB donor 810B to perform the network-initiated inter-donor IAB node migration.

In other optional or additional aspects, the indication 840 may indicate whether to perform the network-initiated inter-donor IAB node migration using a network-initiated UE handover procedure as described above in reference to FIG. 7 or to perform a network-initiated reestablishment procedure. The procedure used to effect the inter-donor IAB node migration may be determined by the first IAB donor 810A and/or the second IAB donor 810B. Alternatively or additionally, the determination may be made by both the first IAB donor 810A and the second IAB donor 810B in coordination. The determination may be based on an indication of availability of the F1 connection 830A to the CU of the first IAB donor 810A. For example, the network-initiated UE handover procedure may be used if or when the third IAB node 820C has the F1 connection 830A to the CU of the first IAB donor 810A and the F1 connection 830B to the CU of the second IAB donor 810B. Alternatively or additionally, the network-initiated reestablishment procedure may be used if or when the third IAB node 820C does not have the F1 connection 830A to the CU of the first IAB donor 810A.

In other optional or additional aspects, the determination may be additionally based on capability reporting by the UE 104 and/or the third IAB node 820C indicating whether the devices support performing the network-initiated reestablishment procedure (e.g., performing reestablishment message exchanges without cell reselection, performing reestablishment without the reestablishment request message).

In other optional aspects, the UE 104 may transmit, in response to receiving the indication 840, a RRC reestablishment request message to the third IAB node 820C to initiate the RRC reestablishment message exchanges. The inter-donor IAB node migration may include establishing a new access link 440B between the UE 104 and the DU3B of the third IAB node 820C and terminating the access link 440A between the UE 104 and the DU3A of the third IAB node 820. The DU3A and the DU3B of the third IAB node 820C may be logical DUs that may use at least a portion of a same physical cell. Alternatively or additionally, the DU3A and the DU3B of the third IAB node 820C may use distinct physical cells.

In other optional or additional aspects, the serving node of the UE 104 (e.g., third IAB node 820C) may not change (i.e., be the same) as a result of the inter-donor IAB node migration. Alternatively or additionally, the inter-donor IAB node migration may cause the UE 104 to transfer to another serving node.

In other optional or additional aspects, the UE 104 may use a same set of receive and/or transmit beams to communicate with the serving node of the UE 104 (e.g., third IAB node 820C) after completion of the inter-donor IAB node migration. That is, the UE 104 may use a same transmit beam and a same receive beam for communicating with the third IAB node 820C after being handed over to the second IAB donor 810B. Alternatively or additionally, the inter-donor IAB node migration may cause the UE 104 to use a different set of receive and/or transmit beams to communicate with the resulting serving node of the UE 104.

In some aspects, the indication 840 transmitted by the third IAB node 820C may comprise a RRC reestablishment message. That is, the third IAB node 820C may transmit a RRC reestablishment message to the UE 104 as described above in reference to FIG. 6. In response, the UE 104 may continue to perform the RRC reestablishment message exchanges according to the received RRC reestablishment message. That is, the UE 104 may be triggered to continue the RRC reestablishment message exchanges described above in reference to FIG. 6 by receiving the RRC reestablishment message.

In such aspects, the RRC reestablishment message may comprise UE context information of CU1 of the first IAB donor 810A. The UE context information of CU1 of the first IAB donor 810A may have been obtained by CU2 of the second IAB donor 810B and provided to the DU3B of the third IAB node 820C via F1 connection 830B. For example, the CU2 of the second IAB donor 810B may retrieve the UE context information of the UE 104 from the CU1 of the first IAB donor 810A via network 860. Alternatively or additionally, the CU1 of the first IAB donor 810A may provide the UE context information of the UE 104 to the CU2 of the second IAB donor 810B as part of the migration of the third IAB node 820C from the first IAB donor 810A to the second IAB donor 810B. For example, the UE context information may be transferred from the CU1 of the first IAB donor 810A to the CU2 of the second IAB donor 810B using UE context transfer messaging as described above in reference to FIG. 7 (e.g., 710 and 725 of FIG. 7). Alternatively or additionally, the UE context information may be transferred from the CU2 of the second IAB donor 810B to the DU3B of the third IAB node 820C using UE context setup messaging as described in reference to FIG. 7 (e.g., 715 and 720 of FIG. 7).

Alternatively or additionally, the DU3A of the third IAB node 820C may share UE context information of the first IAB donor 810A corresponding to the UE 104 with the DU3B of the third node 820C. As such, the DU3B of the third node 820C may use the UE context information to identify the UE 104.

In other optional or additional aspects, the DU3B of the third IAB node 820C may transmit the RRC reestablishment message to the UE 104 via a resource shared with the DU3A of the third IAB node 820C. The shared resource may comprise a shared physical resource, a shared beam, and/or a shared PCI.

In other optional or additional aspects, the RRC reestablishment message may comprise an integrity protection value that the UE 104 may utilize to verify the integrity of the RRC reestablishment message. Alternatively or additionally, the RRC reestablishment message may not be encoded and/or encrypted to allow the UE 104 to read and process the content of the RRC reestablishment message. For example, the UE 104 may verify the integrity of the RRC reestablishment message using the integrity protection value.

In other optional or additional aspects, the use of network-initiated inter-donor IAB node migration may be restricted to transferring child IAB nodes to avoid impact on conventional (e.g., legacy) UEs 104.

Advantageously, the network-initiated inter-donor IAB node migration described above may require only one F1 connection between the IAB node (e.g., DU3B of the third IAB node 820C) and the target IAB donor (e.g., second IAB donor 810B). Further, the network-initiated inter-donor IAB node migration may be effected using conventional RRC reestablishment messaging without requiring the UE 104 to perform cell reselection. Thus, potentially reducing service interruptions associated with the migration.

Figure 9:
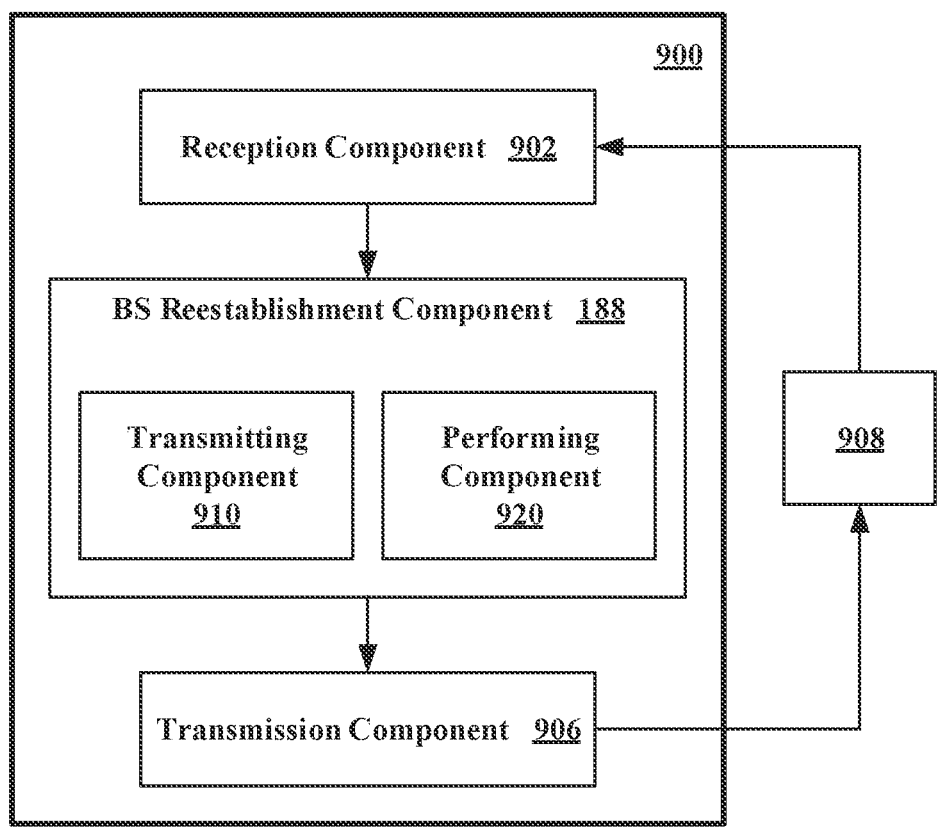
FIG. 9 is a diagram illustrating an example apparatus, such as a base station, for network-triggered reestablishment by a network node of a wireless communication network, in accordance with various aspects of the present disclosure.

FIG. 9 is a block diagram of an example apparatus 900 for network-triggered reestablishment by a network node of a wireless communication network. The apparatus 900 may be a base station 102 (e.g., base station 102 of FIGS. 1 and 3-8) or a base station 102 may include the apparatus 900. In some aspects, the apparatus 900 may include a reception component 902 configured to receive wireless communications from another apparatus (e.g., apparatus 908), a BS reestablishment component 188 configured to perform a network-triggered reestablishment procedure, a transmission component 906 configured to transmit wireless communications to another apparatus (e.g., apparatus 908), and which may be in communication with one another (e.g., via buses or electrical connections). As shown, the apparatus 900 may be in communication with another apparatus 908 (such as a UE 104, or another wireless communication device) using the reception component 902 and the transmission component 906.

In some aspects, the apparatus 900 may be configured to perform one or more operations described herein in connection with FIGS. 1 and 3-6. Alternatively or additionally, the apparatus 900 may be configured to perform one or more processes described herein, such as method 1000 of FIG. 10.

In some aspects, the apparatus 900 may include one or more components of the UE 104 described above in connection with FIGS. 1 and 3-8.

The reception component 902 may receive communications, such as reference signals, control information, data communications, or a combination thereof, from the apparatus 908. The reception component 902 may provide received communications to one or more other components of the apparatus 900, such as the BS reestablishment component 188. In some aspects, the reception component 902 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station 102 described above in connection with FIGS. 1 and 3.

The transmission component 906 may transmit communications, such as reference signals, control information, data communications, or a combination thereof, to the apparatus 908. In some aspects, the BS reestablishment component 188 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In other aspects, the transmission component 906 may include one or more antennas, a modulator, a transmit MIMO processor, a transmit processor, a controller/processor, a memory, or a combination thereof, of the base station 102 described above in connection with FIGS. 1 and 3-8. In some aspects, the transmission component 906 may be co-located with the reception component 902 in a transceiver or transceiver component.

The BS reestablishment component 188 may be configured to perform a network-triggered reestablishment procedure. In some aspects, the BS reestablishment component 188 may include a set of components, such as a transmitting component 910 configured to transmit an indication to perform a RRC reestablishment procedure, and a performing component 920 configured to performing the RRC reestablishment procedure with the apparatus 908 (e.g., UE 104).

Alternatively or additionally, the set of components may be separate and distinct from the BS reestablishment component 188. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1 and 3-8. Alternatively or additionally, one or more components of the set of components may be implemented at least in part as software stored in a memory, such as the memory 317. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIGS. 1 and 3-8.

Figure 10:
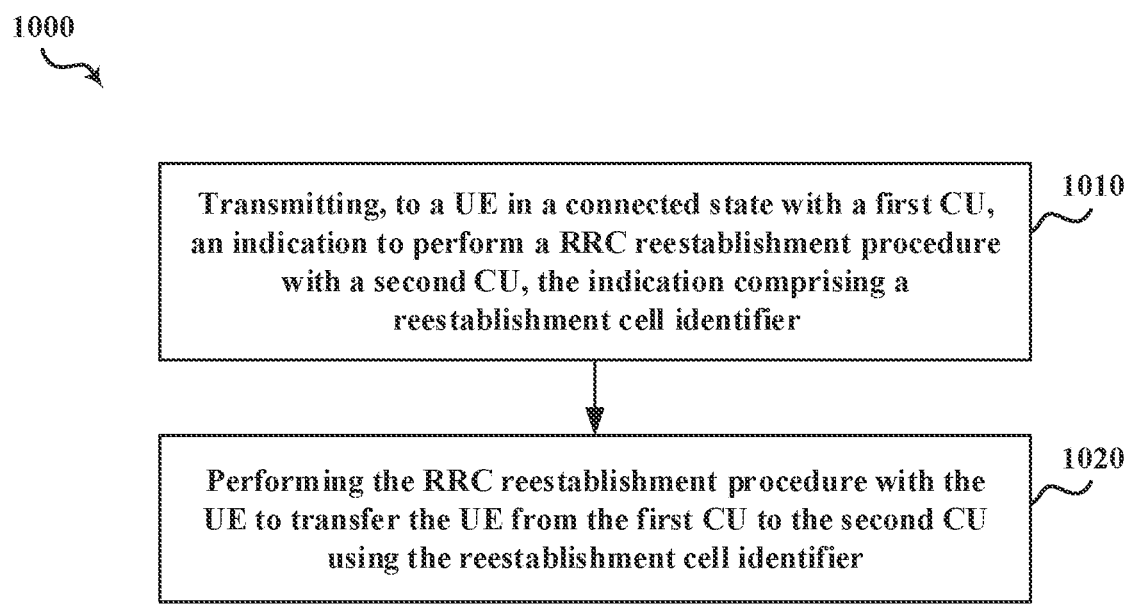
FIG. 10 is a flowchart of a method of network-triggered reestablishment by a network node of a wireless communication network, in accordance with various aspects of the present disclosure.

Referring to FIGS. 9-10, in operation, an apparatus 900 may perform a method 1000 of wireless communication at a network node. Alternatively or additionally, the method 1000 may be performed by the base station 102 (which may include the memory 317 and which may be the entire base station 102 and/or one or more components of the base station 102 such as the BS reestablishment component 188, the TX processor 316, the RX processor 313, and/or the controller/processor 315). The method 1000 may be performed by the BS reestablishment component 188 in communication with the apparatus 908 (e.g., UE 104).

At block 1010 of FIG. 10, the method 1000 includes transmitting, to a user equipment (UE) in a connected state with a first central unit (CU), an indication to perform a radio resource control (RRC) reestablishment procedure with a second CU, the indication comprising a reestablishment cell identifier. For example, in an aspect, the base station 102, the BS reestablishment component 188, and/or the transmitting component 910 may be configured to or may comprise means for transmitting, to a UE 104 in a connected state with a first CU 810A, an indication 840 to perform a RRC reestablishment procedure with a second CU 810B, the indication 840 comprising a reestablishment cell identifier.

For example, the transmitting at block 1010 may include transmitting, by a DU of a IAB node 820 to the UE 104, the indication 840 to perform the RRC reestablishment procedure with a CU of an IAB donor 810, as described above in reference to FIG. 8.

In some aspects, the transmitting at block 1010 may include receiving, from the first CU 810A or the second CU 810B, an instruction to perform the RRC reestablishment procedure with the second CU 810B. In such aspects, the transmitting at block 1010 may be performed in response to receiving the instruction.

In other optional or additional aspects, the transmitting at block 1010 may include transmitting, to the second CU 810B, a message indicating presence of a communication interface between the network node 820 with the first CU 810A. For example, the message may indicate whether the network node 820 has a F1 connection 830A to the first CU 810A. In such optional or additional aspects, the instruction received from the first CU 810A or the second CU 810B may indicate whether to perform the RRC reestablishment procedure according to the presence of the communication interface.

In other optional or additional aspects, the transmitting at block 1010 may include receiving, from the UE 104, capability information indicating whether the UE 104 supports the network-triggered reestablishment. In such optional or additional aspects, the indication 840 may be transmitted to the UE 104 in response to the capability information indicating that the UE 104 supports the network-triggered reestablishment procedure.

In other optional or additional aspects, the transmitting at block 1010 may include transmitting the indication 840 that further indicates to the UE 104 to deactivate deciphering for detection of a RRC reestablishment message. In such optional or additional aspects, the transmitting at block 1010 may include transmitting the indication comprises transmitting the RRC reestablishment message without ciphering.

In other optional or additional aspects, the transmitting at block 1010 may include transmitting the RRC reestablishment message comprising UE context information of the first CU 810A. In such optional or additional aspects, the transmitting at block 1010 may include obtaining, from the first CU 810A, the UE context information.

In other optional or additional aspects, the transmitting at block 1010 may include sharing UE context information of the first CU between a first DU of the network node 820 and a second DU of the network node 820.

In other optional or additional aspects, the transmitting at block 1010 may include transmitting the RRC reestablishment message by a second logical DU of the network node 820 via a shared resource with a first logical DU of the network node 820. In such aspects, the RRC reestablishment message may comprises an integrity protection value. The first logical DU of the network node 820 may be associated with the first CU 810A and the second logical DU may have a communication interface (e.g., F1 connection 830B) with the second CU 810B. The shared resource may be at least one of a shared physical resource, a shared beam, and a shared PCI.

Further, for example, the transmitting at block 1010 may be performed to initiate a network-triggered reestablishment procedure for a UE 104. Advantageously, aspects presented herein provide for network-triggered reestablishment procedures, which may be used to perform the inter-donor IAB node migration, and may not require dual and/or multiple F1 connections. Further, the network-initiated inter-donor IAB node migration may be effected using conventional RRC reestablishment messaging without requiring the UE 104 to perform cell reselection. Thus, potentially reducing service interruptions associated with the migration.

In block 1020 of FIG. 10, the method 1000 includes performing the RRC reestablishment procedure with the UE to transfer the UE from the first CU to the second CU using the reestablishment cell identifier. For example, in an aspect, the base station 102, the BS reestablishment component 188, and/or the performing component 920 may be configured to or may comprise means for performing the RRC reestablishment procedure with the UE 104 to transfer the UE 104 from the first CU 810A to the second CU 810B using the reestablishment cell identifier.

For example, the performing at block 1020 may include performing the RRC reestablishment procedure with the UE 104 to transfer the UE 104 from the first CU 810A to the second CU 810B, as described above in reference to FIG. 8.

In some aspects, the performing at block 1020 may include receiving, from the UE 104, an RRC reestablishment request message in response to the indication 840. In such aspects, the performing at block 1020 may include performing the RRC reestablishment procedure in response to receiving the RRC reestablishment request message from the UE 104.

In other optional or additional aspects, the performing at block 1020 may include establishing a second connection between a second logical DU of the network node 820 and the UE 104. The second logical DU may be associated with at least a portion of a physical cell corresponding to the reestablishment cell identifier.

In other optional or additional aspects, the performing at block 1020 may include terminating a first connection between a first logical DU of the network node 820 and the UE 104. The first logical DU may be associated with the physical cell.

Further, for example, the performing at block 1020 may be performed to migrate the UE 104 from the first IAB donor to the second IAB donor as indicated by the indication transmitted at block 1010. As such, aspects presented herein provide for network-triggered reestablishment procedures, which may be used to perform the inter-donor IAB node migration, and may not require dual and/or multiple F1 connections. Further, the network-initiated inter-donor IAB node migration may be effected using conventional RRC reestablishment messaging without requiring the UE 104 to perform cell reselection. Thus, potentially reducing service interruptions associated with the migration.

Figure 11:
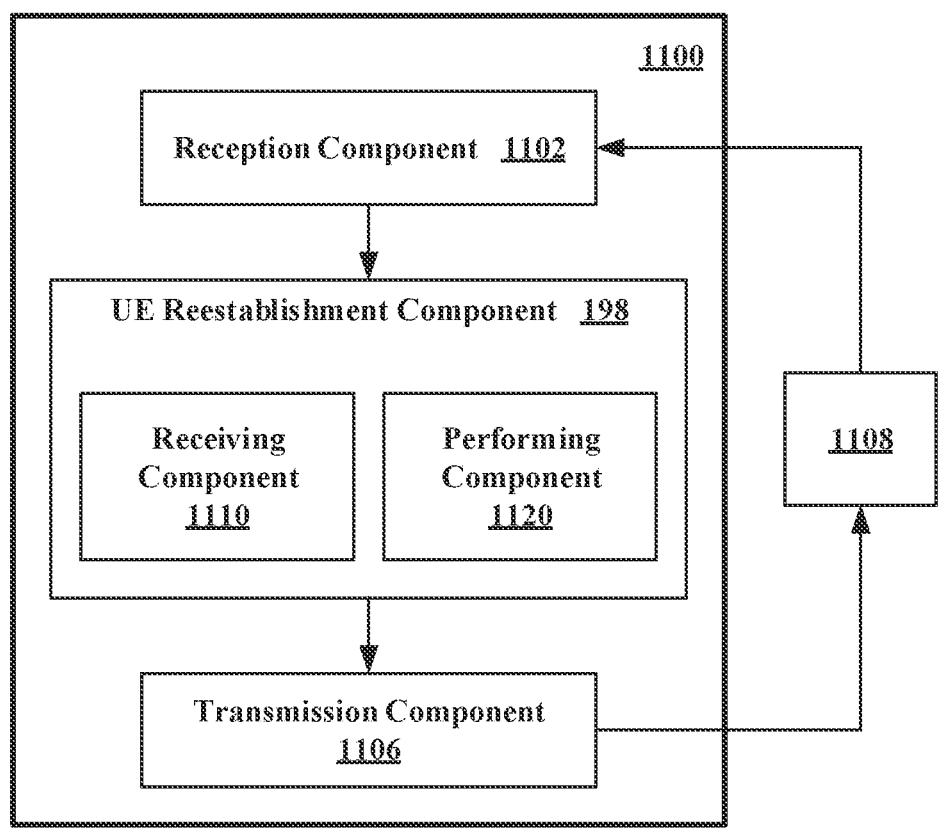
FIG. 11 is a diagram illustrating an example apparatus, such as a UE, for network-triggered reestablishment by a UE of a wireless communication network, in accordance with various aspects of the present disclosure.

FIG. 11 is a block diagram of an example apparatus 1100 for network-triggered reestablishment in a wireless communication network. The apparatus 1100 may be a UE 104 (e.g., UE 104 of FIGS. 1 and 3-8) or a UE 104 may include the apparatus 1100. In some aspects, the apparatus 1100 may include a reception component 1102 configured to receive wireless communications from another apparatus (e.g., apparatus 1108), a UE reestablishment component 198 configured to perform a network-triggered reestablishment procedure, a transmission component 1106 configured to transmit wireless communications to another apparatus (e.g., apparatus 1108), and which may be in communication with one another (e.g., via buses or electrical connections). As shown, the apparatus 1100 may be in communication with another apparatus 1108 (such as a base station 102, or another wireless communication device) using the reception component 1102 and the transmission component 1106.

In some aspects, the apparatus 1100 may be configured to perform one or more operations described herein in connection with FIGS. 1 and 3-8. Alternatively or additionally, the apparatus 1100 may be configured to perform one or more processes described herein, such as method 1200 of FIG. 12. In some aspects, the apparatus 1100 may include one or more components of the UE 104 described above in connection with FIGS. 1 and 3-8.

The reception component 1102 may receive communications, such as reference signals, control information, data communications, or a combination thereof, from the apparatus 1108. The reception component 1102 may provide received communications to one or more other components of the apparatus 1100, such as the UE reestablishment component 198. In some aspects, the reception component 1102 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE 104 described above in connection with FIGS. 1 and 3-8.

The transmission component 1106 may transmit communications, such as reference signals, control information, data communications, or a combination thereof, to the apparatus 1108. In some aspects, the UE reestablishment component 198 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In other aspects, the transmission component 1106 may include one or more antennas, a modulator, a transmit MIMO processor, a transmit processor, a controller/processor, a memory, or a combination thereof, of the UE 104 described above in connection with FIGS. 1 and 3-8. In some aspects, the transmission component 1106 may be co-located with the reception component 1102 in a transceiver or transceiver component.

The UE reestablishment component 198 may be configured to perform a network-triggered reestablishment procedure. In some aspects, the UE reestablishment component 198 may include a set of components, such as a receiving component 1110 configured to receive an indication to perform a RRC reestablishment procedure, and a performing component 1120 configured to perform the RRC reestablishment procedure.

Alternatively or additionally, the set of components may be separate and distinct from the UE reestablishment component 198. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1 and 3-8. Alternatively or additionally, one or more components of the set of components may be implemented at least in part as software stored in a memory, such as the memory 357. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIGS. 1 and 3-8.

Figure 12:
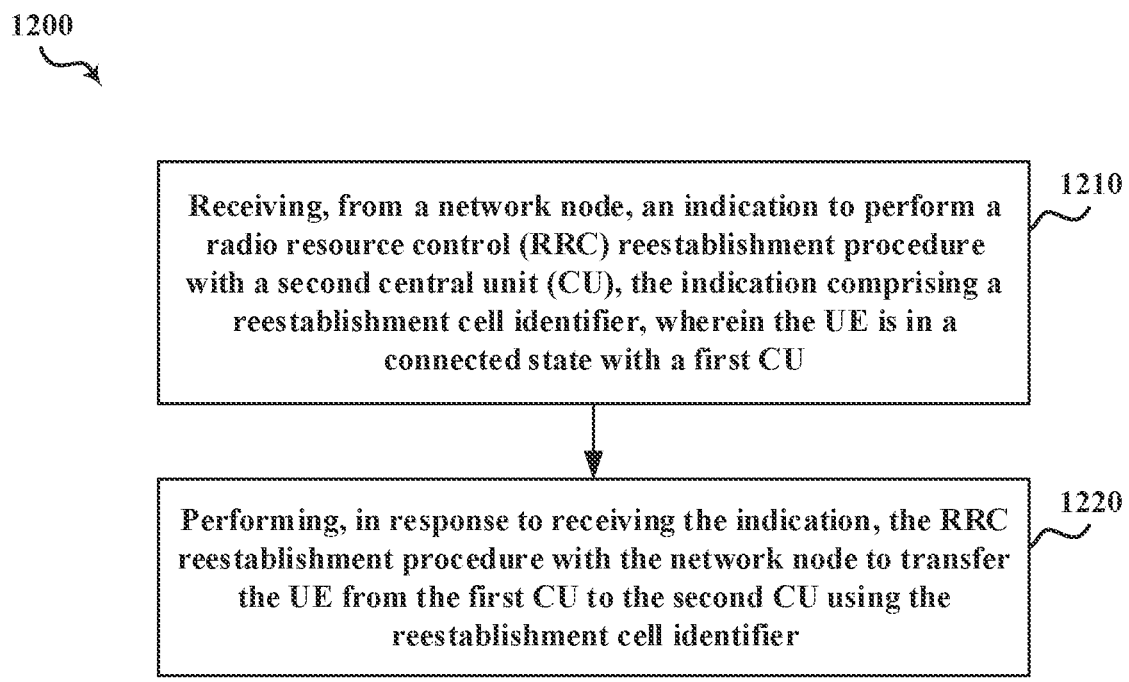
FIG. 12 is a flowchart of a method of network-triggered reestablishment by a UE of a wireless communication network, in accordance with various aspects of the present disclosure.

Referring to FIGS. 11-12, in operation, an apparatus 1100 may perform a method 1200 of wireless communication at a UE 104. Alternatively or additionally, the method 1200 may be performed by the UE 104 (which may include the memory 357 and which may be the entire UE 104 and/or one or more components of the UE 104 such as the UE reestablishment component 198, the TX processor 356, the RX processor 353, and/or the controller/processor 355). The method 1200 may be performed by the UE reestablishment component 198 in communication with the apparatus 1108 (e.g., base station 102).

At block 1210 of FIG. 12, the method 1200 includes receiving, from a network node, an indication to perform a radio resource control (RRC) reestablishment procedure with a second central unit (CU), the indication comprising a reestablishment cell identifier, wherein the UE is in a connected state with a first CU. For example, in an aspect, the UE 104, the UE reestablishment component 198, and/or the receiving component 1110 may be configured to or may comprise means for receiving, from a network node 820, an indication 840 to perform a RRC reestablishment procedure with a second CU 810B, the indication 840 comprising a reestablishment cell identifier, wherein the UE 104 is in a connected state with a first CU 810A.

For example, the receiving at block 1210 may include receiving, from a network node 820, an indication 840 to perform a RRC reestablishment procedure with a second CU 810B, as described above in reference to FIG. 8.

In some aspects, the receiving at block 1210 may include transmitting, to the network node 820 in response to receiving the indication 840, a RRC reestablishment request message.

In other optional or additional aspects, the receiving at block 1210 may include receiving the indication 840 in response to the network node having received, from the first CU 810A or the second CU 810B, an instruction to perform the RRC reestablishment procedure with the second CU 810B.

In other optional or additional aspects, the receiving at block 1210 may include transmitting, to the network node 820, capability information indicating whether the UE 104 supports the network-triggered reestablishment. In such aspects, the receiving at block 1210 may include receiving the indication 840 in response to the capability information indicating that the UE 104 supports the network-triggered reestablishment.

In other optional or additional aspects, the receiving at block 1210 may include receiving the indication 840 further indicates to deactivate deciphering for detection of a RRC reestablishment message. In such aspects, the receiving at block 1210 may include receiving the RRC reestablishment message without deciphering.

In other optional or additional aspects, the receiving at block 1210 may include receiving the RRC reestablishment message that comprises UE context information of the first CU 810A having been shared between a first DU of the network node 820 and a second DU of the network node 820.

In other optional or additional aspects, the receiving at block 1210 may include receiving the RRC reestablishment message from a second logical DU of the network node 820 via a shared resource with a first logical DU of the network node 820. In such aspects, the second logical DU may have a communication interface (e.g., F1 connection 830B) with the second CU 810B. Alternatively or additionally, the shared resource may be at least one of a shared physical resource, a shared beam, and a shared PCI.

In other optional or additional aspects, the receiving at block 1210 may include receiving, from a second logical DU of the network node 820, the RRC reestablishment message comprising an integrity protection value. The first logical DU of the network node 820 may be associated with the first CU 810A and the second logical DU may have a communication interface (e.g., F1 connection 830B) with the second CU 810B. In such aspects, the receiving at block 1210 may include verifying integrity of the RRC reestablishment message using the integrity protection value.

Further, for example, the receiving at block 1210 may be performed to initiate a network-triggered reestablishment procedure for the UE 104. Advantageously, aspects presented herein provide for network-triggered reestablishment procedures, which may be used to perform the inter-donor IAB node migration, and may not require dual and/or multiple F1 connections. Further, the network-initiated inter-donor IAB node migration may be effected using conventional RRC reestablishment messaging without requiring the UE 104 to perform cell reselection. Thus, potentially reducing service interruptions associated with the migration.

In block 1220 of FIG. 12, the method 1200 includes performing, in response to receiving the indication, the RRC reestablishment procedure with the network node to transfer the UE from the first CU to the second CU using the reestablishment cell identifier. For example, in an aspect, the UE 104, the UE reestablishment component 198, and/or the performing component 1120 may be configured to or may comprise means for performing, in response to receiving the indication 840, the RRC reestablishment procedure with the network node 820 to transfer the UE 104 from the first CU 810A to the second CU 810B using the reestablishment cell identifier.

For example, the performing at block 1220 may include performing the RRC reestablishment procedure with the network node 820 to transfer the UE 104 from the first CU 810A to the second CU 810B, as described above in reference to FIG. 8.

In some aspects, the performing at block 1220 may include establishing a second connection between a second logical DU of the network node 820 and the UE 104. The second logical DU may be associated with at least a portion of a physical cell corresponding to the reestablishment cell identifier.

In other optional or additional aspects, the performing at block 1220 may include terminating a first connection between a first logical DU of the network node 820 and the UE 104. The first logical DU may be associated with the physical cell.

Further, for example, the performing at block 1220 may be performed to migrate the UE 104 from the first IAB donor to the second IAB donor as indicated by the indication transmitted at block 1210. As such, aspects presented herein provide for network-triggered reestablishment procedures, which may be used to perform the inter-donor IAB node migration, and may not require dual and/or multiple F1 connections. Further, the network-initiated inter-donor IAB node migration may be effected using conventional RRC reestablishment messaging without requiring the UE 104 to perform cell reselection. Thus, potentially reducing service interruptions associated with the migration.

Implementation examples are described in the following numbered clauses:

1. A method of network-triggered reestablishment by a network node of a wireless communication network, comprising:
    transmitting, to a UE in a connected state with a first CU, an indication to perform a RRC reestablishment procedure with a second CU, the indication comprising a reestablishment cell identifier; and
    performing the RRC reestablishment procedure with the UE to transfer the UE from the first CU to the second CU using the reestablishment cell identifier.

2. The method of clause 1, further comprising:
    receiving, from the UE, an RRC reestablishment request message in response to the indication,
    wherein performing the RRC reestablishment procedure is in response to receiving the RRC reestablishment request message.

3. The method of clause 1 or 2, wherein performing the RRC reestablishment procedure comprises:
    establishing a second connection between a second logical DU and the UE, the second logical DU being associated with at least a portion of a physical cell corresponding to the reestablishment cell identifier; and
    terminating a first connection between a first logical DU and the UE, the first logical DU being associated with the physical cell.

4. The method of any preceding clause 1 to 3, further comprising configuring the UE to use a same transmit beam and a same receive beam for communicating with the network node after being handed over to the second CU, wherein the network node is a serving node of the first CU and the second CU.

5. The method of any preceding clause 1 to 4, wherein transmitting the indication comprises:
    receiving, from the first CU or the second CU, an instruction to perform the RRC reestablishment procedure with the second CU; and transmitting the indication in response to receiving the instruction.

6. The method of any preceding clause 1 to 5, further comprising:
    transmitting, to the second CU, a message indicating presence of a communication interface between the network node with the first CU, wherein the instruction indicates whether to perform the RRC reestablishment procedure according to the presence of the communication interface.

7. The method of any preceding clause 1 to 6, wherein transmitting the indication comprises:
    receiving, from the UE, capability information indicating whether the UE supports the network-triggered reestablishment; and
    transmitting the indication in response to the capability information indicating that the UE supports the network-triggered reestablishment.

8. The method of any preceding clause 1 to 7,
    wherein the indication further indicates to deactivate deciphering for detection of a RRC reestablishment message; and
    wherein transmitting the indication comprises transmitting the RRC reestablishment message without ciphering 9. The method of any preceding clause 1 to 8,
    wherein the RRC reestablishment message comprises UE context information of the first CU; and
    wherein transmitting the RRC reestablishment message comprises obtaining, from the first CU, the UE context information.

10. The method of any preceding clause 1 to 9, wherein transmitting the RRC reestablishment message comprises sharing UE context information of the first CU between a first DU of the network node and a second DU of the network node.

11. The method of any preceding clause 1 to 10, wherein transmitting the RRC reestablishment message comprises transmitting the RRC reestablishment message by a second logical DU of the network node via a shared resource with a first logical DU of the network node, wherein the second logical DU has a communication interface with the second CU, and the shared resource being at least one of a shared physical resource, a shared beam, and a shared PCI.

12. The method of any preceding clause 1 to 11, wherein transmitting the RRC reestablishment message comprises transmitting, by a second logical DU of the network node, the RRC reestablishment message comprising an integrity protection value, wherein a first logical DU of the network node is associated with the first CU and the second logical DU has a communication interface with the second CU.

13. An apparatus of network-triggered reestablishment by a network node of a wireless communication network, comprising a memory storing instructions, and a processor communicatively coupled with the memory and configured to execute the instructions to perform one or more methods of any preceding clause 1 to 12.

14. An apparatus of network-triggered reestablishment by a network node of a wireless communication network, comprising means for performing one or more methods of any preceding clause 1 to 12.

15. A computer-readable medium storing instructions of network-triggered reestablishment by a network node of a wireless communication network, executable by a processor, to perform one or more methods of any preceding clause 1 to 12.

16. A method of network-triggered reestablishment by a UE of a wireless communication network, comprising:
  receiving, from a network node, an indication to perform a RRC reestablishment procedure with a second CU, the indication comprising a reestablishment cell identifier, wherein the UE is in a connected state with a first CU; and
  performing, in response to receiving the indication, the RRC reestablishment procedure with the network node to transfer the UE from the first CU to the second CU using the reestablishment cell identifier.

17. The method of clause 16, further comprising transmitting, in response to receiving the indication, a RRC reestablishment request message.

18. The method of clause 16 or 17, wherein performing the RRC reestablishment procedure comprises:
  establishing a second connection between a second logical DU and the UE, the second logical DU being associated with at least a portion of a physical cell corresponding to the reestablishment cell identifier; and
  terminating a first connection between a first logical DU and the UE, the first logical DU being associated with the physical cell.

19. The method of any preceding clause 16 to 18, wherein the method further comprises communicating with the network node using a same transmit beam and a same receive beam after being handed over to the second CU, wherein the network node is a serving node of the first CU and the second CU.

20. The method of any preceding clause 16 to 19, wherein receiving the indication comprises:
  receiving the indication in response to the network node having received, from the first CU or the second CU, an instruction to perform the RRC reestablishment procedure with the second CU.

21. The method of any preceding clause 16 to 20, wherein receiving the indication comprises:
  transmitting, to the network node, capability information indicating whether the UE supports the network-triggered reestablishment; and
  receiving the indication in response to the capability information indicating that the UE supports the network-triggered reestablishment.

22. The method of any preceding clause 16 to 21,
  wherein the indication further indicates to deactivate deciphering for detection of a RRC reestablishment message; and
  wherein receiving the indication comprises receiving the RRC reestablishment message without deciphering.

23. The method of any preceding clause 16 to 22, wherein the RRC reestablishment message comprises UE context information of the first CU, the UE context information having been obtained from the first CU.

24. The method of any preceding clause 16 to 23, wherein the RRC reestablishment message comprises UE context information of the first CU having been shared between a first DU of the network node and a second DU of the network node.

25. The method of any preceding clause 16 to 24, wherein receiving the RRC reestablishment message comprises receiving the RRC reestablishment message from a second logical DU of the network node via a shared resource with a first logical DU of the network node, wherein the second logical DU has a communication interface with the second CU, and the shared resource being at least one of a shared physical resource, a shared beam, and a shared PCI.

26. The method of any preceding clause 16 to 25, wherein receiving the RRC reestablishment message comprises:
  receiving, from a second logical DU of the network node, the RRC reestablishment message comprising an integrity protection value, wherein a first logical DU of the network node is associated with the first CU and the second logical DU has a communication interface with the second CU; and
  verifying integrity of the RRC reestablishment message using the integrity protection value.

27. An apparatus of network-triggered reestablishment by a UE of a wireless communication network, comprising a memory storing instructions, and a processor communicatively coupled with the memory and configured to execute the instructions to perform one or more methods of any preceding clause 16 to 26.

23. An apparatus of network-triggered reestablishment by a UE of a wireless communication network, comprising means for performing one or more methods of any preceding clause 16 to 26.

24. A computer-readable medium storing instructions of network-triggered reestablishment by a UE of a wireless communication network, executable by a processor, to perform one or more methods of any preceding clause 16 to 26.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of network-triggered reestablishment by a network node of a wireless communication network, comprising:
   transmitting, to a user equipment (UE) in a connected state with a first central unit (CU), an indication to perform a radio resource control (RRC) reestablishment procedure with a second CU, the indication comprising a reestablishment cell identifier;
   terminating a first connection between a first logical distributed unit (DU) and the UE, the first logical DU being associated with a physical cell; and
   performing the RRC reestablishment procedure with the UE to transfer the UE from the first CU to the second CU using the reestablishment cell identifier and establish a second connection between a second logical DU and the UE, the second logical DU being associated with at least a portion of a physical cell corresponding to the reestablishment cell identifier.

2. The method of claim 1, further comprising:
   receiving, from the UE, an RRC reestablishment request message in response to the indication,
   wherein performing the RRC reestablishment procedure is in response to receiving the RRC reestablishment request message.

3. The method of claim 1, wherein transmitting the indication comprises:
   receiving, from the first CU or the second CU, an instruction to perform the RRC reestablishment procedure with the second CU; and
   transmitting the indication in response to receiving the instruction.

4. The method of claim 3, further comprising:
   transmitting, to the second CU, a message indicating presence of a communication interface between the network node with the first CU, wherein the instruction indicates whether to perform the RRC reestablishment procedure according to the presence of the communication interface.

5. The method of claim 1, wherein transmitting the indication comprises:
   receiving, from the UE, capability information indicating whether the UE supports the network-triggered reestablishment; and
   transmitting the indication in response to the capability information indicating that the UE supports the network-triggered reestablishment.

6. The method of claim 1,
   wherein the indication further indicates to deactivate deciphering for detection of a RRC reestablishment message; and
   wherein transmitting the indication comprises transmitting the RRC reestablishment message without ciphering.

7. The method of claim 6,
   wherein the RRC reestablishment message comprises UE context information of the first CU; and
   wherein transmitting the RRC reestablishment message comprises obtaining, from the first CU, the UE context information.

8. The method of claim 6, wherein transmitting the RRC reestablishment message comprises sharing UE context information of the first CU between a first distributed unit (DU) of the network node and a second DU of the network node.

9. The method of claim 6, wherein transmitting the RRC reestablishment message comprises transmitting the RRC reestablishment message by a second logical distributed unit (DU) of the network node via a shared resource with a first logical DU of the network node, wherein the RRC reestablishment message comprises an integrity protection value, wherein the first logical DU of the network node is associated with the first CU and the second logical DU has a communication interface with the second CU, and the shared resource being at least one of a shared physical resource, a shared beam, and a shared physical cell identification (PCI).

10. An apparatus of network-triggered reestablishment by a network node of a wireless communication network, comprising:
    a memory storing instructions; and
    a processor communicatively coupled with the memory and configured to execute the instructions to:
       transmit, to a user equipment (UE) in a connected state with a first central unit (CU), an indication to perform a radio resource control (RRC) reestablishment procedure with a second CU, the indication comprising a reestablishment cell identifier and indicates to deactivate deciphering for detection of a RRC reestablishment message; and
       perform the RRC reestablishment procedure with the UE to transfer the UE from the first CU to the second CU using the reestablishment cell identifier.

11. The apparatus of claim 10, wherein the processor is further configured to execute the instructions to:
    receive, from the UE, an RRC reestablishment request message in response to the indication, wherein performing the RRC reestablishment procedure is in response to receiving the RRC reestablishment request message.

12. The apparatus of claim 10, wherein to perform the RRC reestablishment procedure comprises to:
    establish a second connection between a second logical distributed unit (DU) and the UE, the second logical DU being associated with at least a portion of a physical cell corresponding to the reestablishment cell identifier; and
    terminate a first connection between a first logical DU and the UE, the first logical DU being associated with the physical cell.

13. The apparatus of claim 10,
    wherein to transmit the indication comprises to transmit the RRC reestablishment message without ciphering.

14. The apparatus of claim 13, wherein to transmit the RRC reestablishment message comprises to transmit the RRC reestablishment message by a second logical distributed unit (DU) of the network node via a shared resource with a first logical DU of the network node, wherein the RRC reestablishment message comprises an integrity protection value, wherein the first logical DU of the network node is associated with the first CU and the second logical DU has a communication interface with the second CU, and the shared resource being at least one of a shared physical resource, a shared beam, and a shared physical cell identification (PCI).

15. A method of network-triggered reestablishment by a user equipment (UE) of a wireless communication network, comprising:
    receiving, from a network node, an indication to perform a radio resource control (RRC) reestablishment procedure with a second central unit (CU), the indication comprising a reestablishment cell identifier, wherein the UE is in a connected state with a first CU;
    terminating a first connection between a first logical distributed unit (DU) and the UE, the first logical DU being associated with the physical cell; and
    performing, in response to receiving the indication, the RRC reestablishment procedure with the network node to transfer the UE from the first CU to the second CU using the reestablishment cell identifier and establish a connection between a second logical EDU and the UE, the second logical DU being associated with at least a portion of a physical cell corresponding to the reestablishment cell identifier.

16. The method of claim 15, further comprising transmitting, in response to receiving the indication, a RRC reestablishment request message.

17. The method of claim 15, wherein receiving the indication comprises:
    receiving the indication in response to the network node having received, from the first CU or the second CU, an instruction to perform the RRC reestablishment procedure with the second CU.

18. The method of claim 15, wherein receiving the indication comprises:
    transmitting, to the network node, capability information indicating whether the UE supports the network-triggered reestablishment; and
    receiving the indication in response to the capability information indicating that the UE supports the network-triggered reestablishment.

19. The method of claim 15,
    wherein the indication further indicates to deactivate deciphering for detection of a RRC reestablishment message; and
    wherein receiving the indication comprises receiving the RRC reestablishment message without deciphering.

20. The method of claim 19, wherein the RRC reestablishment message comprises UE context information of the first CU, the UE context information having been obtained from the first CU.

21. The method of claim 19, wherein the RRC reestablishment message comprises UE context information of the first CU having been shared between a first distributed unit (DU) of the network node and a second DU of the network node.

22. The method of claim 19, wherein receiving the RRC reestablishment message comprises receiving the RRC reestablishment message from a second logical distributed unit (DU) of the network node via a shared resource with a first logical DU of the network node, wherein the second logical DU has a communication interface with the second CU, and the shared resource being at least one of a shared physical resource, a shared beam, and a shared physical cell identification (PCI).

23. The method of claim 19, wherein receiving the RRC reestablishment message comprises:
    receiving, from a second logical distributed unit (DU) of the network node, the RRC reestablishment message comprising an integrity protection value, wherein a first logical DU of the network node is associated with the first CU and the second logical DU has a communication interface with the second CU; and
    verifying integrity of the RRC reestablishment message using the integrity protection value.

24. An apparatus of network-triggered reestablishment by a user equipment (UE) of a wireless communication network, comprising:
    a memory storing instructions; and
    a processor communicatively coupled with the memory and configured to execute the instructions to:
        receive, from a network node, an indication to perform a radio resource control (RRC) reestablishment procedure with a second central unit (CU), the indication comprising a reestablishment cell identifier and indicates to deactivate deciphering for detection of a RRC reestablishment message, wherein the UE is in a connected state with a first CU; and
        perform, in response to receiving the indication, the RRC reestablishment procedure with the network node to transfer the UE from the first CU to the second CU using the reestablishment cell identifier.

25. The apparatus of claim 24, wherein the processor is further configured to execute the instructions to transmit, in response to receiving the indication, a RRC reestablishment request message.

26. The apparatus of claim 24, wherein to perform the RRC reestablishment procedure comprises to:
    establish a second connection between a second logical distributed unit (DU) and the UE, the second logical DU being associated with at least a portion of a physical cell corresponding to the reestablishment cell identifier; and
    terminate a first connection between a first logical DU and the UE, the first logical DU being associated with the physical cell.

27. The apparatus of claim 24,
    wherein to receive the indication comprises to receive the RRC reestablishment message without deciphering.

28. The apparatus of claim 27, wherein to receive the RRC reestablishment message comprises to:
- receive the RRC reestablishment message from a second logical distributed unit (DU) of the network node via a shared resource with a first logical DU of the network node, wherein the RRC reestablishment message comprises an integrity protection value, wherein the first logical DU of the network node is associated with the first CU and the second logical DU has a communication interface with the second CU, and the shared resource being at least one of a shared physical resource, a shared beam, and a shared physical cell identification (PCI); and
- verify integrity of the RRC reestablishment message using the integrity protection value.

* * * * *